US010176559B2

(12) United States Patent  
Ogawa

(10) Patent No.: US 10,176,559 B2  
(45) Date of Patent: Jan. 8, 2019

(54) IMAGE PROCESSING METHOD APPLIED TO AN ELECTRONIC DEVICE WITH AN IMAGE ACQUIRING UNIT AND ELECTRONIC DEVICE

(71) Applicant: Lenovo (Beijing) Co., Ltd., Beijing (CN)

(72) Inventor: Kaname Ogawa, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 622 days.

(21) Appl. No.: 14/673,083

(22) Filed: Mar. 30, 2015

(65) Prior Publication Data

US 2016/0110853 A1    Apr. 21, 2016

(30) Foreign Application Priority Data

Dec. 22, 2001 (CN) .......................... 2014 1 0806384  
Oct. 20, 2014 (CN) .......................... 2014 1 0558794

(51) Int. Cl.
*G06T 5/00* (2006.01)  
*H04N 5/232* (2006.01)  
(Continued)

(52) U.S. Cl.
CPC ......... *G06T 5/006* (2013.01); *H04N 5/23219* (2013.01); *H04N 5/23229* (2013.01); *H04N 5/2628* (2013.01); *H04N 5/3572* (2013.01)

(58) Field of Classification Search
CPC ................ G06T 5/006; H04N 5/23219; H04N 5/23229; H04N 5/2628; H04N 5/3572  
See application file for complete search history.

(56) References Cited

U.S. PATENT DOCUMENTS

2007/0171288 A1* 7/2007 Inoue ................. H04N 1/32352  
348/241  
2010/0097481 A1    4/2010 Taoka  
(Continued)

FOREIGN PATENT DOCUMENTS

CN    1678035 A    10/2005  
CN    1684499 A    10/2005  
(Continued)

OTHER PUBLICATIONS

Office Action, and English language translation thereof, in corresponding Chinese Application No. 201410558794.3, dated Dec. 23, 2016, 17 pages.

(Continued)

*Primary Examiner* — Nhan T Tran  
(74) *Attorney, Agent, or Firm* — Brinks Gilson & Lione; John C. Freeman

(57) ABSTRACT

An image processing method and an electronic device are disclosed. The image processing method includes obtaining distance information of at least one portion of pixels in an image acquired by the image acquiring unit, the distance information indicating a distance from the image acquiring unit to a shot object to which each pixel among the at least one portion of pixels corresponds; determining magnifications of the at least one portion of pixels based on the distance information and optical characteristics of the image acquiring unit; and adjusting the image based on the magnifications of the at least one portion of pixels.

10 Claims, 14 Drawing Sheets

(51) Int. Cl.
    *H04N 5/262*    (2006.01)
    *H04N 5/357*    (2011.01)

(56) References Cited

U.S. PATENT DOCUMENTS

| | | | | |
|---|---|---|---|---|
| 2011/0157396 A1* | 6/2011 | Kotani | ................... | H04N 5/232 |
| | | | | 348/222.1 |
| 2015/0091900 A1* | 4/2015 | Yang | ....................... | G06T 5/006 |
| | | | | 345/419 |
| 2015/0189267 A1* | 7/2015 | Kaji | ....................... | G06T 5/006 |
| | | | | 348/187 |

FOREIGN PATENT DOCUMENTS

| | | | |
|---|---|---|---|
| CN | 1830002 A | 9/2006 | |
| CN | 102694993 A | 9/2012 | |

OTHER PUBLICATIONS

Second Office Action (6 pages including English translation) dated Jul. 10, 2017 in corresponding Chinese priority Application No. 201410558794.3.

* cited by examiner

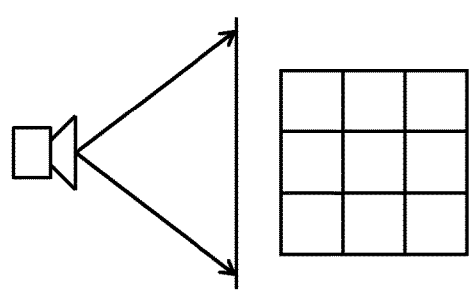
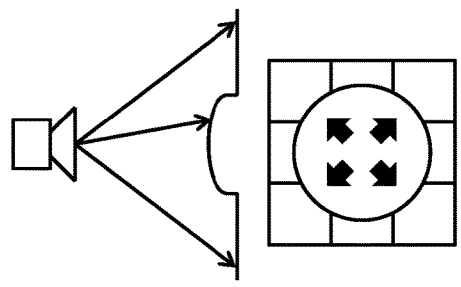
FIG. 1A                    FIG. 1B
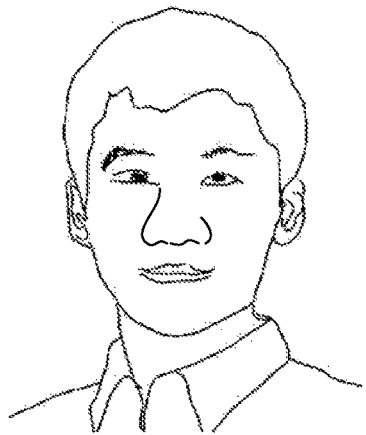
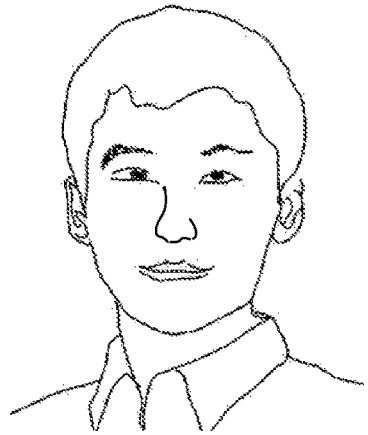
FIG. 2A                    FIG. 2B

IMAGE PROCESSING METHOD APPLIED TO AN ELECTRONIC DEVICE WITH AN IMAGE ACQUIRING UNIT AND ELECTRONIC DEVICE

This application claims priority to Chinese patent application No. 201410558794.3 filed on Oct. 20, 2014; and also to Chinese patent application No. 201410806384.6 filed on Dec. 22, 2014, the entire contents of which are incorporated herein by reference.

The present application relates to the field of image processing, and more particularly, to an image processing method and an electronic device capable of not only correcting image distortion caused by perspective deformation at a low cost, but also modifying an image shot by using a lens with an arbitrary focal length to a perspective effect shot by using other lens with an arbitrary focal length.

BACKGROUND

As we all know, one way for our eyes to identify a distance is to use relative sizes of objects. Specifically, the farther we are away from an object, the smaller the object appears, and the closer we are away from the object, the bigger the object appears. This "closer-bigger farther-smaller" relationship is called perspective relationship. In photography, perspective relationship' degree is relevant to a distance between a camera and a shot object, in particular, the farther the distance between the camera and the shot object is, the weaker the perspective relationship is, and the closer the distance between the camera and the shot object is, the stronger the perspective relationship is. A distortion caused by perspective relationship is called perspective deformation.

FIGS. 1A and 1B are schematic diagrams illustrating principles of perspective deformation. As shown in FIG. 1A, when the shot object is a plane object, since distances from the lens to the object are approximately the same, so it is possible to image uniformly without excessive perspective deformation. However, as shown in FIG. 1B, when the shot object is not a plane, for example, a certain part of the shot object has a convex portion toward the lens, since the convex portion is more closer to the lens, then the convex portion located in the middle of the shot image will be magnified.

Nowadays, electronic devices such as mobile phone, laptop, tablet PC and others always have an image acquiring unit like a camera, in order to achieve a shooting function. However, the image acquiring unit of these electronic devices usually requires a close-up shot, so a wide-angle lens is often used to get a wider range of image. For example, when using a self-imaging function of a smart phone, it often needs to shoot the entire face at a close distance, so the smart phone's front camera is often a wide-angle lens. FIGS. 2A and 2B are schematic diagrams illustrating a distortion caused by perspective deformation. As shown in FIG. 2A, in the image shot by using the smart phone's front camera, since the nose tip is closer to the camera, obviously, the nose of the shot object appears larger in comparison to other organs in the face, the face looks quite incoordinated, which seriously affects the self-imaging effect.

Conversely, if a telephoto lens whose focal length is too large is used to shoot the face, then it needs to shoot in a very far place. As shown in FIG. 2B, as the shot object is farther away, the shot image starts to become flat, losing a sense of depth and details, the face looks no third dimension, which is "flat face".

In order to solve the problem of such distortion caused by perspective deformation, by means of high-grade lens optical design and sophisticated materials, lens manufactured by using an optimized design of lens group and high-quality optical glass (such as fluorite glass) has already appeared, this can make perspective deformation decrease to a very low degree.

However, it is still impossible to completely eliminate perspective deformation by using this method, currently, lens with the highest quality still produces different degrees of deformation and distortion when being tested under extremely strict conditions. Moreover, the lens manufactured with such high-quality optical glass will lead to a great increase of cost, especially it is hard to gain popularity in electronic devices that do not give priority to the photo shooting function, like smart phone, laptop, tablet PC and others.

SUMMARY

An embodiment of the present application provides an image processing method applied to an electronic device with an image acquiring unit, the method comprising: obtaining, by at least one sensing unit, distance information of at least one portion of pixels in an image acquired by the image acquiring unit, the distance information indicating a distance from the image acquiring unit to a shot object to which each pixel among the at least one portion of pixels corresponds; determining magnifications of the at least one portion of pixels based on the distance information and optical characteristics of the image acquiring unit; and adjusting the image based on the magnifications of the at least one portion of pixels.

An embodiment of the present application further provides an image processing method applied to an electronic device with an image acquiring unit, the method comprising: configuring a plurality of control points in a predetermined region of an image acquired by the image acquiring unit; determining respective magnifications of the plurality of control points based on respective distance information of the plurality of control points and optical characteristics of the image acquiring unit, the distance information indicating a distance from the image acquiring unit to a shot object to which a control point corresponds; calculating respective positions of the plurality of control points in the image based on the magnifications; dividing the predetermined region into a plurality of adjustment regions with the plurality of control points as vertices; and adjusting, for each adjustment region, a position of each pixel point within the adjustment region in the image based on positions of the vertices in the image before and after adjustment.

An embodiment of the present application further provides an electronic device comprising: an image acquiring unit, at least one sensing unit for obtaining distance information of at least one portion of pixels in an image acquired by the image acquiring unit, the distance information indicating a distance from the image acquiring unit to a shot object to which each pixel among the at least one portion of pixels corresponds; a magnification determining module configured to determine magnifications of the at least one portion of pixels based on the distance information and optical characteristics of the image acquiring unit; and an image adjusting module configured to adjust the image based on the magnifications of the at least one portion of pixels.

An embodiment of the present application further provides an electronic device with an image acquiring unit, the electronic device comprising: a control point configuring module configured to configure a plurality of control points in a predetermined region of an image acquired by the image acquiring unit; a magnification determining module configured to determine respective magnifications of the plurality of control points based on respective distance information of the plurality of control points and optical characteristics of the image acquiring unit, the distance information indicating a distance from the image acquiring unit to a shot object to which a control point corresponds; a control point position calculating module configured to calculate respective positions of the plurality of control points in the image based on the magnifications; a region dividing module configured to divide the predetermined region into a plurality of adjustment regions with the plurality of control points as vertices; and an image adjusting module configured to adjust, for each adjustment region, a position of each pixel point within the adjustment region in the image based on positions of the vertices in the image before adjustment and after adjustment as calculated by the control point position calculating module.

BRIEF DESCRIPTION OF THE DRAWINGS

FIGS. 1A and 1B are schematic diagrams illustrating principles of perspective deformation.

FIGS. 2A and 2B are schematic diagrams illustrating a distortion caused by perspective deformation.

DETAILED DESCRIPTION

Hereinafter, to make those skilled in the art better understand the technical solutions of the present application, specific implementations of the image processing method and the electronic device provided by the present application will be explained in detail in conjunction with the accompanying drawings.

First Image Processing Method

A first image processing method will be described below in conjunction with the accompanying drawings. The image processing method in the present application is applied to an electronic device with an image acquiring unit. The image acquiring unit typically is a camera with photosensitive elements like CCD or CMOS and so on, but in fact it is not limited thereto, the image acquiring unit may also be any other type of sensors capable of acquiring an image. The electronic device is not limited to devices that give priority to the picture shooting function like video camera, camera etc., it may be for example devices that give priority to the computing function like tablet PC, notebook computer, desktop computer, PDA etc., may also be devices that give priority to the display function like e-book, TV, monitor etc., and may also be devices that give priority to the calling function like smart phone, portable phone etc., so long as it comprises an image acquiring unit. Obviously, other embodiments obtained by those with ordinary skill in the art without paying inventive effort all are within the scope sought for protection in the present application.

Figure 3:
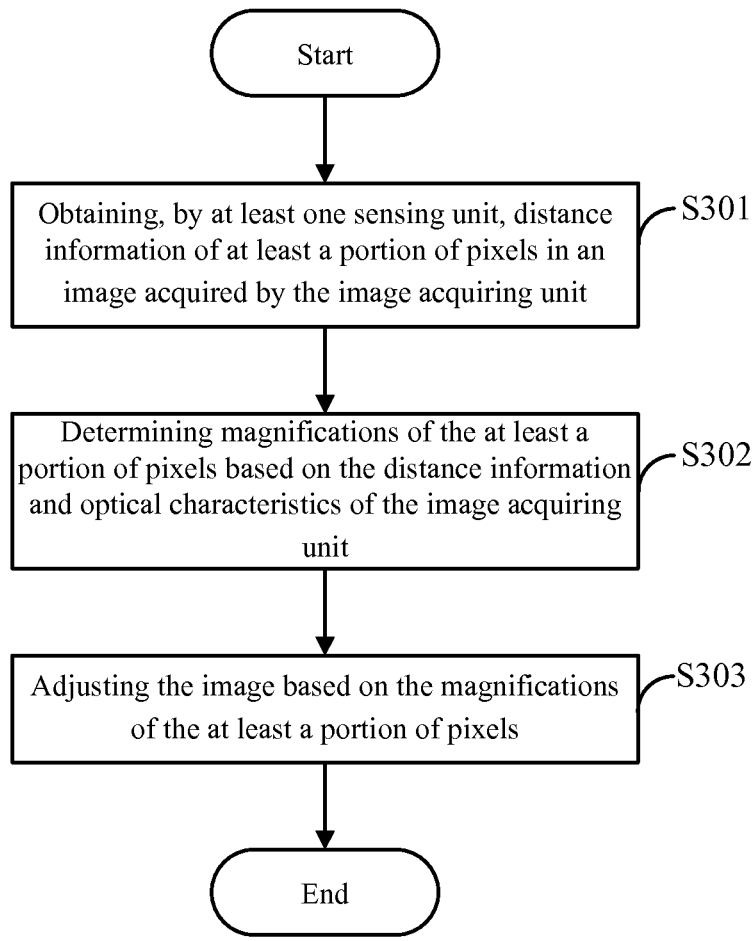
FIG. 3 is flowchart illustrating a first image processing method according to an embodiment of the present application.

FIG. 3 is flowchart illustrating the first image processing method according to an embodiment of the present application. As shown in FIG. 3, the method comprises the following steps.

Figure 4:
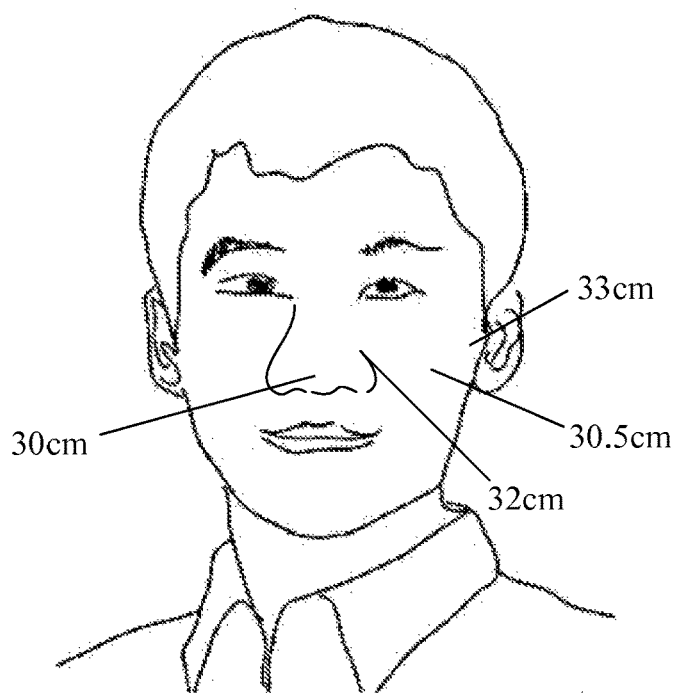
FIG. 4 is a schematic diagram illustrating distance information of pixels in an embodiment of the present application.

First, obtaining, by at least one sensing unit, distance information of at least one portion of pixels in an image acquired by the image acquiring unit (step S301). The sensing unit is an element for measuring a distance from the image acquiring unit to a shot object, it for example is an element like laser distance sensor, infrared distance sensor and so on, it may also be another image acquiring unit besides the aforesaid image acquiring unit, thereby a distance is calculated based on two images acquired by two image acquiring units at different positions. The distance information is a distance from the image acquiring unit to the shot object to which respective pixels in the image acquired by using the image acquiring unit correspond. FIG. 4 is a schematic diagram illustrating distance information of pixels in an embodiment of the present application, it is assumed that the shot object is human face and the sensing unit acquires that a distance from the image acquiring unit to the nose tip is 30 cm, a distance from the image acquiring unit to the nose groove is 32 cm, a distance from the image acquiring unit to the cheek is 30.5 cm, and a distance from the image acquiring unit to the ear root is 33 cm, then in the image, the distance information to which the nose tip corresponds is 30 cm, the distance information to which the nose groove corresponds is 32 cm, the distance information to which the cheek corresponds is 30.5 cm, and the distance information to which the ear root corresponds is 33 cm, and so on, and so forth, it is possible to obtain the distance information of respective pixels in the shot image. Here, the sensing unit may obtain distance information of all pixels in the image, and may also obtain distance information of pixels of merely a main identified portion in the image. For example, when an image comprises human face and background, it is possible to obtain distance information of pixels of merely the human face in the image.

Figure 5:
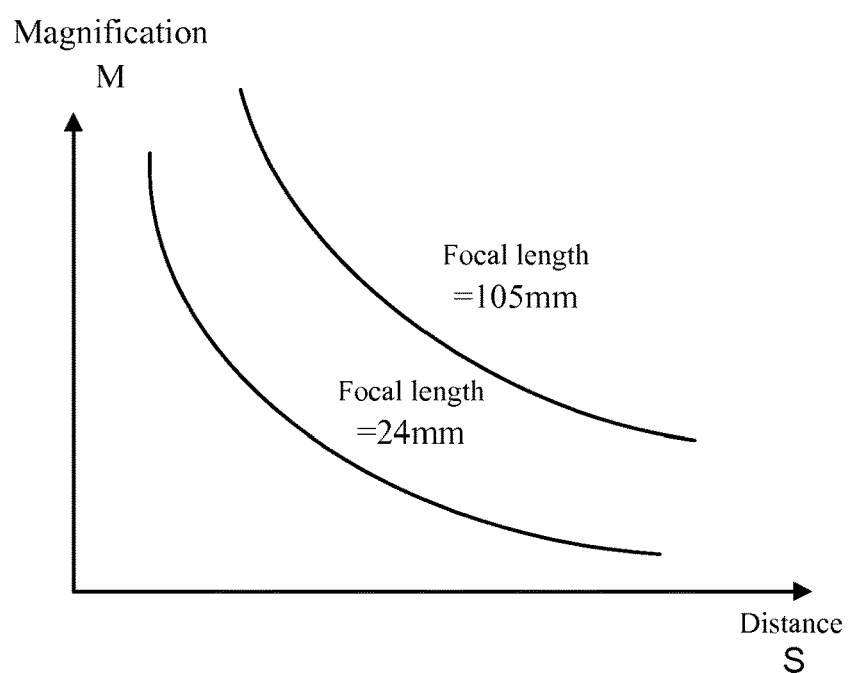
FIG. 5 is a diagram illustrating a relationship between magnification and distance of lenses with different focal lengths.

Next, determining magnifications of the at least one portion of pixels based on the distance information and optical characteristics of the image acquiring unit (step S302). Typically, when the image acquiring unit is a camera including a lens and a photosensitive unit, it is possible to determine the magnification of each pixel whose distance information is obtained based on the distance information and optical characteristics of a focal length of the lens. FIG. 5 is a diagram illustrating a relationship between magnification and distance of lenses with different focal lengths. As shown in FIG. 5, no matter the lens is of what types of focal length, the same rule is followed: the farther the object is away from the lens, the more the object in the image is reduced; the closer the object is away from the lens, the more the object in the image is magnified. However, a curve slop coefficient of a lens whose focal length is 24 mm is larger than that of a lens whose focal length is 105 mm, which suggests that the degree of size change caused by distance in the wide-angle lens is more severe than the degree of size change caused by distance in the telephoto lens, in other words, the perspective relationship of the image shot by the wide-angle lens is stronger than the perspective relationship of the image shot by the telephoto lens. A base point of the magnification is an optical center of the lens, that is, the magnification of the size of the object to which the optical center of the lens is aligned. It should be noted that although FIG. 5 only shows the rule for the lens whose focal length is 24 mm and the lens whose focal length is 105 mm, in fact, this rule is also applicable to the lens with other focal lengths. Under ideal conditions, the following relationship is satisfied:

$$M = \frac{f}{S-f} \quad (1)$$

where the focal length of the lens is f, the distance from the lens to the shot object is S, and the magnification is M.

Figure 6:
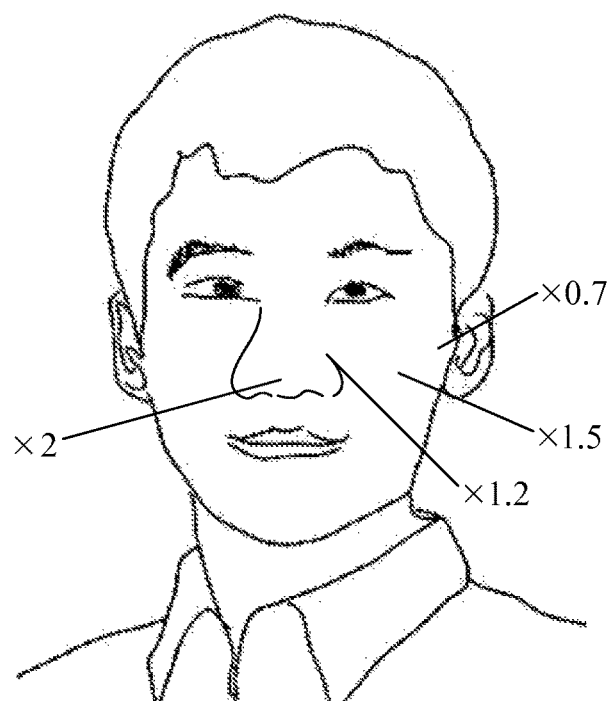
FIG. 6 is a schematic diagram illustrating magnifications of pixels in an embodiment of the present application.

Thus it is seen that, once the focal length of the lens is determined, then a unique relationship curve between the distance S and the magnification M can be obtained, that is, an optical characteristic curve to which the focal length corresponds. Thereby, the magnification of the pixel can be determined based on the distance information of the pixel and the characteristic curve to which the focal length of the lens corresponds. Specifically, it is possible to obtain the magnification as shown in FIG. 6 by combining the optical characteristic curve to which the focal length of the lens that shoots corresponds based on the distance information in FIG. 4. FIG. 6 is a schematic diagram illustrating magnifications of pixels in an embodiment of the present application. As shown in FIG. 6, it can be determined that the magnification of the pixel to which the nose tip corresponds is 2 times, the magnification of the pixel to which the nose groove corresponds is 1.2 times, the magnification of the pixel to which the cheek corresponds is 1.5 times, and the magnification of the pixel to which the ear root corresponds is 0.7 time, and so on, and so forth, it is possible to obtain the magnification of each pixel whose distance is obtained.

Last, adjusting the image based on the magnifications of the at least one portion of pixels (step S303). After the magnifications of pixels are obtained, an image without perspective deformation can be obtained by reducing the portion whose magnification is larger and enlarging the portion whose magnification is smaller. Specifically, various methods may be used to reduce or enlarge a certain portion in an image. As an example, it is possible to adjust a position of a pixel in the image based on the magnification of the pixel. As for each pixel whose magnification is obtained above, the distance from the pixel to a point corresponding to an optical center of the lens in the image is adjusted based on its magnification, so that the larger the magnification of the pixel is, the shorter the distance from the pixel to the point corresponding to an optical center of the lens in the image is.

Figure 7:
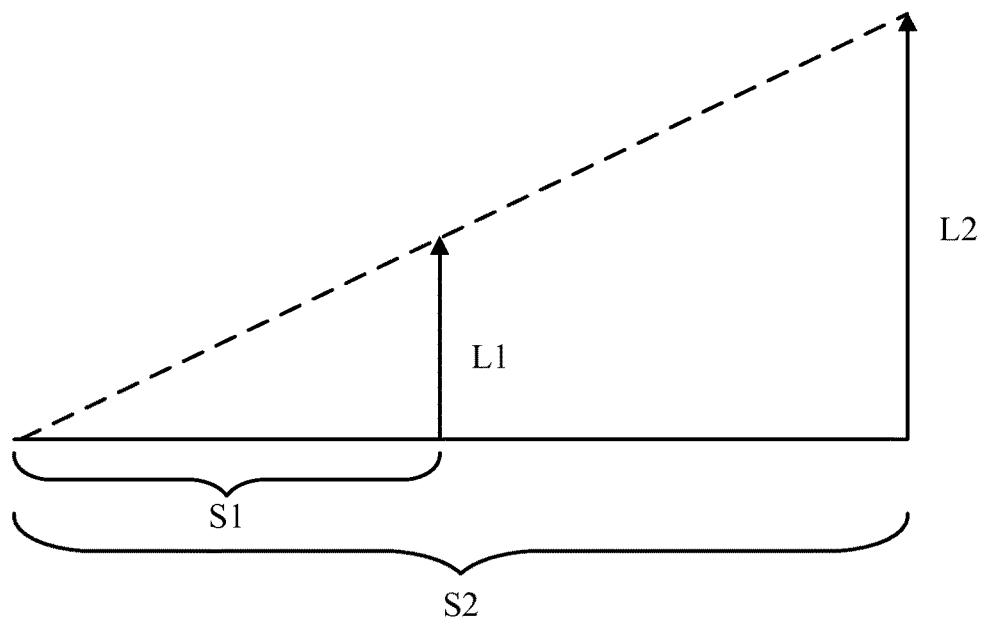
FIG. 7 is a schematic diagram illustrating a relationship between magnification and position of pixel points.

FIG. 7 is a schematic diagram illustrating a relationship between magnification and position of pixel points. In FIG. 7, L1 and L2 are sizes of two objects, S1 and S2 are distances from the two objects to a certain reference point, respectively, according to principles of similar triangles, the following is satisfied:

$$\frac{L1}{S1} = \frac{L2}{S2} \quad (2)$$

It is supposed that L1 is a size of a standard object (for example, the size of the object to which an optical center of the lens is aligned), L2 is a size of an object that is enlarged due to perspective deformation (magnification M≥1), then the magnification M is:

$$M = \frac{L2}{L1} \quad (3)$$

Therefore, if it is desired to eliminate distortion caused by perspective deformation, that is, reducing the enlarged object whose size is L2 into the size L1, then the distance between the pixel and the reference point may be adjusted as:

$$S1 = \frac{L1 \times S2}{L2} = \frac{S2}{M} \qquad (4)$$

Figure 8:
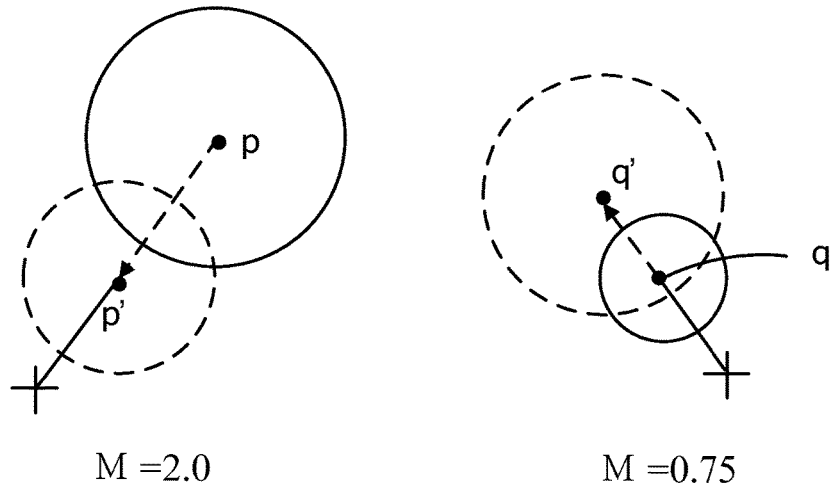
FIG. 8 is a schematic diagram of adjusting positions of pixels in an image based on magnifications in an embodiment of the present application.

FIG. 8 is a schematic diagram of adjusting positions of pixels in an image based on magnifications in an embodiment of the present application. In FIG. 8, "+" represents the reference point, which is a point corresponding to the optical center of the lens in the image. If magnification of the pixel at point p is M=2, it shows that the pixel is magnified two times relative to the standard size, thus the distance from the pixel to the reference point is reduced to a half according to Expression (4), that is, the pixel is moved to position p', that is, it is reduced as the standard size, as shown in the left in FIG. 8. If magnification of the pixel at point p is M=0.75, it shows that the pixel is reduced 0.75 time relative to the standard size, thus the distance from the pixel to the reference point is multiplied with 0.75 according to Expression (4), that is, the pixel is moved to the position q', that is, it is magnified as the standard size, as shown in the right in FIG. 8.

Specifically, it is supposed that coordinates of the reference point are $(x_0, y_0)$ and coordinates of the pixel before adjustment are (x, y), then coordinates (x', y') after adjustment respectively are:

$$x' = x_0 + \frac{(x - x_0)}{M} \qquad (5)$$

$$y' = y_0 + \frac{(y - y_0)}{M} \qquad (6)$$

As long as the above processing is performed on each pixel whose magnification is obtained, an image with perspective distortion can be corrected to a standard image. It should be noted that, when reducing the image by shortening the distance from the pixel to the reference point, if there is superimpose of a plurality of pixels, some pixels can be discarded. On the contrary, when enlarging the image by extending the distance between the image and the reference point, if some positions lack pixels so that the image is not smooth, then it is possible to fill pixels at the positions that lack pixel according to colors of pixels around the positions.

By means of the above method, distortion caused by perspective deformation can be completely eliminated without using high-quality optical glass.

However, besides correcting the distortion caused by perspective deformation, sometimes users desire to obtain an image with a distortion degree shot by a lens with other focal lengths. For example, it is generally considered that the lens with a focal length of 85 mm to 135 mm is best suited for shooting a portrait. Because a person's facial features are the most beautiful when looking from 1.2 to 1.5 meters away, the perspective effect at this distance makes a person's nose appear slightly smaller than it actually is and the face is not so planar. And it requires a focal length of 85 mm to 135 mm to accommodate a human face when the shooting range is 1.2 to 1.5 meters. But, generally, the lens of the image acquiring unit attached to electronic devices, especially those that do not give priority to the shooting function, is a wide-angle lens. In this case, if the perspective relationship shot with the wide-angle lens can be modified to the perspective relationship shot with a focal length of 85 mm to 135 mm, then a "beautifying" effect can be achieved.

In order to solve this technical problem, the present application further provides an embodiment, to modify an image shot with a lens having one focal length into an image shot with a lens having another focal length, so as to change the perspective relationship. Hereinafter, description is provided with modifying the human face image shot with a lens with a focal length of 24 mm as the perspective effect shot with a lens with a focal length of 105 mm as example, but in fact it is not limited thereto, as will be appreciated by those skilled in the art, the method can modify an image shot by using a lens with an arbitrary focal length to a perspective effect shot by using other lens with an arbitrary focal length. In addition, the shot object is not limited to human face; it may be any other objects, sceneries and so on.

Figure 9:
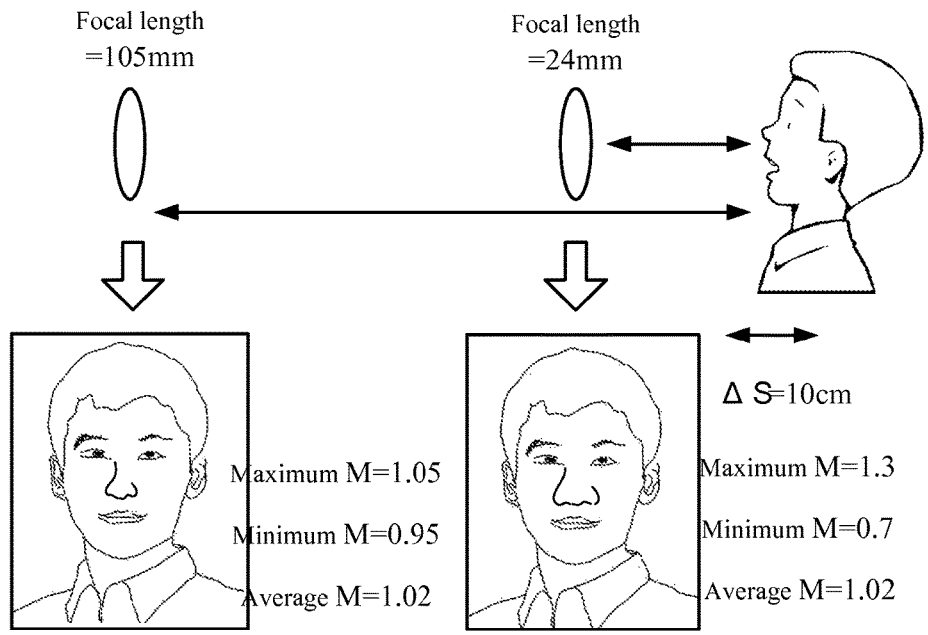
FIG. 9 is a schematic diagram of modifying an image shot by using a lens with one focal length to a perspective effect shot by using a lens with another focal length according to an embodiment of the present application.

FIG. 9 is a schematic diagram of modifying an image shot by using a lens with one focal length to a perspective effect shot by using a lens with another focal length according to an embodiment of the present application. The image shown in the right in FIG. 9 can be obtained when shooting human face using a wide-angle lens with a focal length of 24 mm at a close distance. Since the distance is closer, the perspective relationship is stronger, thus resulting in that the nose in the shot human face becomes larger. Thus people want to modify it as the perspective effect shot using a lens with a focal length of 105 mm from a relative farther distance, that is, modified as the image shown in the left in FIG. 9.

First, distance information of each pixel in a main identified portion (which typically comprises only the human face without the background) in the image is obtained by the sensing unit. Details of this step have already been described above, no more repeats here.

Figure 10:
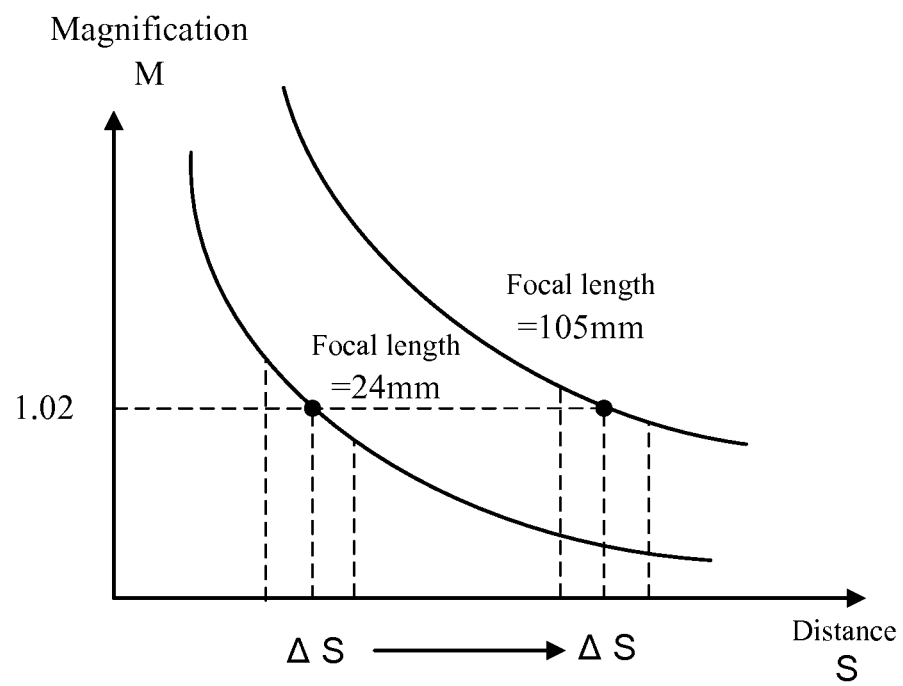
FIG. 10 is a schematic diagram illustrating a relationship between magnification and distance when modifying an image shot by using a lens with one focal length to a perspective effect of an image shot by using a lens with another focal length according to an embodiment of the present application.

Next, a current magnification $M_{24}$ and a target magnification $M_{105}$ of each pixel in the main identified portion are obtained based on the distance information and an optical characteristic curve whose focal length is 24 mm. Details of obtaining the current magnification $M_{24}$ have already been described in the above, no more details repeated here. After obtaining the current magnification $M_{24}$ of each pixel in the main identified portion, it is possible to calculate the current maximum magnification, minimum magnification, and average magnification of these pixels. As shown in the right in FIG. 9, in this example, among all the pixels in the main identified portion in the human face image shot with a focal length of 24 mm, the maximum magnification is 1.3, the minimum magnification is 0.7, and the average magnification is 1.02. FIG. 10 is a schematic diagram illustrating a relationship between magnification and distance when modifying an image shot by using a lens with one focal length to a perspective effect of an image shot by using a lens with another focal length according to an embodiment of the present application. As shown in FIG. 10, the points corresponding to the maximum magnification (1.3), the minimum magnification (0.7), and the average magnification (1.02) are found in the optical characteristic curve whose focal length is 24 mm. Since the magnification M and the distance S correspond to each other one by one, thus a distance difference between the distance to which the maximum magnification corresponds and the distance to which the minimum magnification corresponds is a distance ΔS between the portion (nose tip) that is closest to the lens in the human face to the portion (edge of the cheek) that is farthest to the lens. It should be noted that, for the same image (such as the human face occupies the whole image), the larger the focal length is, the farther the lens needs to be away from the human face, and the smaller the focal length is, the nearer the lens needs to be away from the human face. Since the actual size of human face maintains unchanged, no matter shooting by a lens with what focal length, the distance ΔS is constant (e.g., 10 cm). Thus, it is possible to first find a point to which the average magnification (1.02) corresponds in the optical characteristic curve whose focal length is 105 mm, and then perform a translation with this point as a reference (as shown by the arrow in FIG. 10), thus the target magnification $M_{105}$ of each pixel when using a lens with a focal length of 105 mm to shot an image in which human face occupied the whole image can be obtained for the pixel, for example, the maximum magnification is 1.05, the minimum magnification is 0.95 etc., as shown in the left in FIG. 9.

It is possible to further perform the following processing on each pixel in the main identified portion.

First, a difference $S_{offset}$ between distance information $S_1$ of the pixel and a distance to which a pixel having an average magnification (1.02) on the optical characteristic curve whose focal length is 24 mm corresponds is calculated.

Second, a distance $S_{avg105}$ to which a pixel having an average magnification (1.02) on the optical characteristic curve whose focal length is 105 mm corresponds is obtained.

Last, a magnification $M_{105}$ of a point to which a distance obtained by adding $S_{avg105}$ and $S_{offset}$ corresponds is obtained.

The above processing is performed on each pixel in the main identified portion so that the target magnification $M_{105}$ for each pixel can be obtained.

Next, the image is adjusted based on the current magnification $M_{24}$ and the target magnification $M_{105}$ of the pixels in the main identified portion. In this case, an image having the perspective effect with a focal length of 105 mm can be obtained only by reducing or enlarging the pixels to the magnification $M_{105}$. Specifically, various methods may be used to reduce or enlarge a certain portion in the image. As an example, it is possible to adjust a position of a pixel in the image based on the current magnification $M_{24}$ and the target magnification $M_{105}$ of the pixel. For each pixel whose current magnification $M_{24}$ and target magnification $M_{105}$ are obtained, the distance from the pixel to a point corresponding to an optical center of the lens in the image is adjusted. In particular, it is supposed that coordinates of the reference point are $(x_0, y_0)$ and coordinates of the pixel before adjustment are $(x, y)$, then coordinates $(x', y')$ after adjustment respectively are:

$$x' = x_0 + \frac{M_{105} \times (x - x_0)}{M_{24}} \quad (7)$$

$$y' = y_0 + \frac{M_{105} \times (y - y_0)}{M_{24}} \quad (8)$$

As long as the above processing is performed on each pixel in the main identified portion, the image shown in the left in FIG. 8 can be obtained. It should be noted that, when reducing the image by shortening the distance from the pixel to the reference point, if there is superimpose of a plurality of pixels, some pixels can be discarded. On the contrary, when enlarging the image by extending the distance between the image and the reference point, if some positions lack pixels so that the image is not smooth, then it is possible to fill pixels at the positions that lack pixel according to colors of pixels around the positions.

By means of the above method, distortion caused by perspective deformation can be completely eliminated without using high-quality optical glass.

Multiple embodiments of the image processing method in the present application have been described above. Obviously, those skilled in the art can make various combinations, modifications, or variants on the aforesaid embodiments without departing from the spirit and scope of the present application. Other embodiments obtained by those with ordinary skill in the art without paying inventive effort all are within the scope sought for protection in the present application.

First Electronic Device

Hereinafter, an electronic device will be described below in conjunction with the accompanying drawings. The electronic device in the present application comprises an image acquiring unit. The image acquiring unit typically is a camera with photosensitive elements like CCD or CMOS and so on, but in fact it is not limited thereto, the image acquiring unit may also be any other type of sensors capable of acquiring an image. The electronic device is not limited to devices that give priority to the picture shooting function like video camera, camera etc., it may be for example devices that give priority to the computing function like tablet PC, notebook computer, desktop computer, PDA etc., may also be devices that give priority to the display function like e-book, TV, monitor etc., and may also be devices that give priority to the calling function like smart phone, portable phone etc., so long as it comprises an image acquiring unit.

Figure 11:
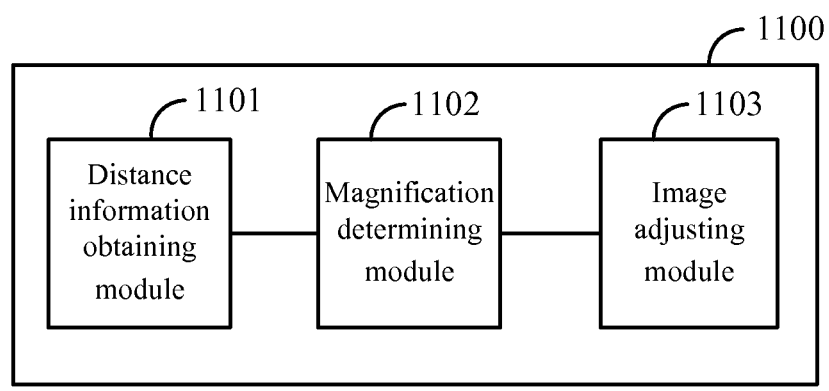
FIG. 11 is a functional block diagram illustrating a first electronic device according to an embodiment of the present application.

FIG. 11 is a functional block diagram illustrating an electronic device according to an embodiment of the present application. As shown in FIG. 11, the electronic device 1100 comprises: a distance information obtaining module 1101, a magnification determining module 1102, and an image adjusting module 1103.

The distance information obtaining module 1101 configured to obtain, by at least one sensing unit, distance information of at least one portion of pixels in an image acquired by the image acquiring unit. The sensing unit is an element for measuring a distance from the image acquiring unit to a shot object, it for example is an element like laser distance sensor, infrared distance sensor and so on, it may also be another image acquiring unit besides the aforesaid image acquiring unit, thereby a distance is calculated based on two images acquired by two image acquiring units at different positions. The distance information is a distance from the image acquiring unit to the shot object to which respective pixels in the image acquired by using the image acquiring unit correspond. FIG. 4 is a schematic diagram illustrating distance information of pixels in an embodiment of the present application, it is assumed that the shot object is human face and the sensing unit acquires that a distance from the image acquiring unit to the nose tip is 30 cm, a distance from the image acquiring unit to the nose groove is 32 cm, a distance from the image acquiring unit to the cheek is 30.5 cm, and a distance from the image acquiring unit to the ear root is 33 cm, then in the image, the distance information to which the nose tip corresponds is 30 cm, the distance information to which the nose groove corresponds is 32 cm, the distance information to which the cheek corresponds is 30.5 cm, and the distance information to which the ear root corresponds is 33 cm, and so on, and so forth, it is possible to obtain the distance information of respective pixels in the shot image. Here, the sensing unit may obtain distance information of all pixels in the image, and may also obtain distance information of pixels of merely a main identified portion in the image. For example, when an image comprises human face and background, it is possible to obtain distance information of pixels of merely the human face in the image.

The magnification determining module 1102 is configured to determine magnifications of the at least one portion of pixels based on the distance information and optical characteristics of the image acquiring unit. Typically, when the image acquiring unit is a camera including a lens and a photosensitive unit, it is possible to determine the magnification of each pixel whose distance information is obtained based on the distance information and optical characteristics of a focal length of the lens. FIG. 5 is a diagram illustrating a relationship between magnification and distance of lenses with different focal lengths. As shown in FIG. 5, no matter the lens is of what types of focal length, the same rule is followed: the farther the object is away from the lens, the more the object in the image is reduced; the closer the object is away from the lens, the more the object in the image is magnified. However, a curve slop coefficient of a lens whose focal length is 24 mm is larger than that of a lens whose focal length is 105 mm, which suggests that the degree of size change caused by distance in the wide-angle lens is more severe than the degree of size change caused by distance in the telephoto lens, in other words, the perspective relationship of the image shot by the wide-angle lens is stronger than the perspective relationship of the image shot by the telephoto lens. A base point of the magnification is an optical center of the lens, that is, the magnification of the size of the object to which the optical center of the lens is aligned. It should be noted that although FIG. 5 only shows the rule for the lens whose focal length is 24 mm and the lens whose focal length is 105 mm, in fact, this rule is also applicable to the lens with other focal lengths. Under ideal conditions, the following relationship is satisfied:

$$M = \frac{f}{S-f} \quad (1)$$

where the focal length of the lens is f, the distance from the lens to the shot object is S, and the magnification is M.

Thus it is seen that, once the focal length of the lens is determined, then a unique relationship curve between the distance S and the magnification M can be obtained, that is, an optical characteristic curve to which the focal length corresponds. Thereby, the magnification of the pixel can be determined based on the distance information of the pixel and the characteristic curve to which the focal length of the lens corresponds. Specifically, it is possible to obtain the magnification as shown in FIG. 6 by combining the optical characteristic curve to which the focal length of the lens that shoots corresponds based on the distance information in FIG. 4. FIG. 6 is a schematic diagram illustrating magnifications of pixels in an embodiment of the present application. As shown in FIG. 6, it can be determined that the magnification of the pixel to which the nose tip corresponds is 2 times, the magnification of the pixel to which the nose groove corresponds is 1.2 times, the magnification of the pixel to which the cheek corresponds is 1.5 times, and the magnification of the pixel to which the ear root corresponds is 0.7 time, and so on, and so forth, it is possible to obtain the magnification of each pixel whose distance is obtained.

The image adjusting module 1103 is configured to adjust the image based on the magnifications of the at least one portion of pixels. After the magnifications of pixels are obtained, an image without perspective deformation can be obtained by reducing the portion whose magnification is larger and enlarging the portion whose magnification is smaller. Specifically, various methods may be used to reduce or enlarge a certain portion in an image. As an example, it is possible to adjust a position of a pixel in the image based on the magnification of the pixel. As for each pixel whose magnification is obtained above, the distance from the pixel to a point corresponding to an optical center of the lens in the image is adjusted based on its magnification, so that the larger the magnification of the pixel is, the shorter the distance from the pixel to the point corresponding to an optical center of the lens in the image is.

FIG. 7 is a schematic diagram illustrating a relationship between magnification and position of pixel points. In FIG. 7, L1 and L2 are sizes of two objects, S1 and S2 are distances from the two objects to a certain reference point, respectively, according to principles of similar triangles, the following is satisfied:

$$\frac{L1}{S1} = \frac{L2}{S2} \quad (2)$$

It is supposed that L1 is a size of a standard object (for example, the size of the object to which an optical center of the lens is aligned), L2 is a size of an object that is enlarged due to perspective deformation (magnification M≥1), then the magnification M is:

$$M = \frac{L2}{L1} \quad (3)$$

Therefore, if it is desired to eliminate distortion caused by perspective deformation, that is, reducing the enlarged object whose size is L2 into the size L1, then the distance between the pixel and the reference point may be adjusted as:

$$S1 = \frac{L1 \times S2}{L2} = \frac{S2}{M} \quad (4)$$

FIG. 8 is a schematic diagram of adjusting positions of pixels in an image based on magnifications in an embodiment of the present application. In FIG. 8, "+" represents the reference point, which is a point corresponding to the optical center of the lens in the image. If magnification of the pixel at point p is M=2, it shows that the pixel is magnified two times relative to the standard size, thus the distance from the pixel to the reference point is reduced to a half according to Expression (4), that is, the pixel is moved to position p', that is, it is reduced as the standard size, as shown in the left in FIG. 8. If magnification of the pixel at point p is M=0.75, it shows that the pixel is reduced 0.75 time relative to the standard size, thus the distance from the pixel to the reference point is multiplied with 0.75 according to Expression (4), that is, the pixel is moved to the position q', that is, it is magnified as the standard size, as shown in the right in FIG. 8.

Specifically, it is supposed that coordinates of the reference point are $(x_0, y_0)$ and coordinates of the pixel before adjustment are $(x, y)$, then coordinates $(x', y')$ after adjustment respectively are:

$$x' = x_0 + \frac{(x - x_0)}{M} \quad (5)$$

$$y' = y_0 + \frac{(y - y_0)}{M} \quad (6)$$

As long as the above processing is performed on each pixel whose magnification is obtained, an image with perspective distortion can be corrected to a standard image. It should be noted that, when reducing the image by shortening the distance from the pixel to the reference point, if there is superimpose of a plurality of pixels, some pixels can be discarded. On the contrary, when enlarging the image by extending the distance between the image and the reference point, if some positions lack pixels so that the image is not smooth, then it is possible to fill pixels at the positions that lack pixel according to colors of pixels around the positions.

Second Image Processing Method

By means of the above method, distortion caused by perspective deformation can be completely eliminated without using high-quality optical glass.

However, besides correcting the distortion caused by perspective deformation, sometimes users desire to obtain an image with a distortion degree shot by a lens with other focal lengths. For example, it is generally considered that the lens with a focal length of 85 mm to 135 mm is best suited for shooting a portrait. Because a person's facial features are the most beautiful when looking from 1.2 to 1.5 meters away, the perspective effect at this distance makes a person's nose appear slightly smaller than it actually is and the face is not so planar. And it requires a focal length of 85 mm to 135 mm to accommodate a human face when the shooting range is 1.2 to 1.5 meters. But, generally, the lens of the image acquiring unit attached to electronic devices, especially those that do not give priority to the shooting function, is a wide-angle lens. In this case, if the perspective relationship shot with the wide-angle lens can be modified to the perspective relationship shot with a focal length of 85 mm to 135 mm, then a "beautifying" effect can be achieved.

In order to solve this technical problem, the present application further provides an embodiment, to modify an image shot with a lens having one focal length into an image shot with a lens having another focal length, so as to change the perspective relationship. Hereinafter, description is provided with modifying the human face image shot with a lens with a focal length of 24 mm as the perspective effect shot with a lens with a focal length of 105 mm as example, but in fact it is not limited thereto, as will be appreciated by those skilled in the art, the method can modify an image shot by using a lens with an arbitrary focal length to a perspective effect of an image shot by using other lens with an arbitrary focal length. In addition, the shot object is not limited to human face; it may be any other objects, sceneries and so on.

FIG. 9 is a schematic diagram of modifying an image shot by using a lens with one focal length to a perspective effect shot by using a lens with another focal length according to an embodiment of the present application. The image shown in the right in FIG. 9 can be obtained when shooting human face using a wide-angle lens with a focal length of 24 mm at a close distance. Since the distance is closer, the perspective relationship is stronger, thus resulting in that the nose in the shot human face becomes larger. Thus people want to modify it as the perspective effect shot using a lens with a focal length of 105 mm from a relative farther distance, that is, modified as the image shown in the left in FIG. 9.

In this case, the respective modules of the electronic device 1100 execute the following processing:

The distance information obtaining module 1101 obtains distance information of each pixel in a main identified portion (which typically comprises only the human face without the background) in the image by the sensing unit. Details of this step have already been described above, no more repeats here.

Next, the magnification determining module 1102 obtains a current magnification $M_{24}$ and a target magnification $M_{105}$ of each pixel in the main identified portion based on the distance information and an optical characteristic curve whose focal length is 24 mm. Details of obtaining the current magnification $M_{24}$ have already been described in the above, no more repeats here. After obtaining the current magnification $M_{24}$ of each pixel in the main identified portion, it is possible to calculate the current maximum magnification, minimum magnification, and average magnification of these pixels. As shown in the right in FIG. 9, in this example, among all the pixels in the main identified portion in the human face image shot with a focal length of 24 mm, the maximum magnification is 1.3, the minimum magnification is 0.7, and the average magnification is 1.02. FIG. 10 is a schematic diagram illustrating a relationship between magnification and distance when modifying an image shot by using a lens with one focal length to a perspective effect of an image shot by using a lens with another focal length according to an embodiment of the present application. As shown in FIG. 10, the points corresponding to the maximum magnification (1.3), the minimum magnification (0.7), and the average magnification (1.02) are found in the optical characteristic curve whose focal length is 24 mm. Since the magnification M and the distance S correspond to each other one by one, thus a distance difference between the distance to which the maximum magnification corresponds and the distance to which the minimum magnification corresponds is a distance $\Delta S$ between the portion (nose tip) that is closest to the lens in the human face to the portion (edge of the cheek) that is farthest to the lens. It should be noted that, for the same image (such as the human face occupies the whole image), the larger the focal length is, the farther the lens needs to be away from the human face, and the smaller the focal length is, the nearer the lens needs to be away from the human face. Since the actual size of human face maintains unchanged, no matter shooting by a lens with what focal length, the distance $\Delta S$ is constant (e.g., 10 cm). Thus, it is possible to first find a point to which the average magnification (1.02) corresponds in the optical characteristic curve whose focal length is 105 mm, and then perform a translation with this point as a reference (as shown by the arrow in FIG. 10), thus the target magnification $M_{105}$ of each pixel when using a lens with a focal length of 105 mm to shot an image in which human face occupied the whole image can be obtained for the pixel, for example, the maximum magnification is 1.05, the minimum magnification is 0.95 etc., as shown in the left in FIG. 9.

It is possible to further perform the following processing on each pixel in the main identified portion.

First, a difference $S_{offset}$ between distance information $S_1$ of the pixel and a distance to which a pixel having an average magnification (1.02) on the optical characteristic curve whose focal length is 24 mm corresponds is calculated.

Second, a distance $S_{avg105}$ to which a pixel having an average magnification (1.02) on the optical characteristic curve whose focal length is 105 mm corresponds is obtained.

Last, a magnification $M_{105}$ of a point to which a distance obtained by adding $S_{avg105}$ and $S_{offset}$ corresponds is obtained.

The above processing is performed on each pixel in the main identified portion so that the target magnification $M_{105}$ for each pixel can be obtained.

Next, the image adjusting module 1103 adjusts the image based on the current magnification $M_{24}$ and the target magnification $M_{105}$ of the pixels in the main identified portion. In this case, an image having the perspective effect with a focal length of 105 mm can be obtained only by reducing or enlarging the pixels to the magnification $M_{105}$. Specifically, various methods may be used to reduce or enlarge a certain portion in the image. As an example, it is possible to adjust a position of a pixel in the image based on the current magnification $M_{24}$ and the target magnification $M_{105}$ of the pixel. For each pixel whose current magnification $M_{24}$ and target magnification $M_{105}$ are obtained, the distance from the pixel to a point corresponding to an optical center of the lens in the image is adjusted. In particular, it is supposed that coordinates of the reference point are $(x_0, y_0)$ and coordinates of the pixel before adjustment are $(x, y)$, then coordinates $(x', y')$ after adjustment respectively are:

$$x' = x_0 + \frac{M_{105} \times (x - x_0)}{M_{24}} \quad (7)$$

$$y' = y_0 + \frac{M_{105} \times (y - y_0)}{M_{24}} \quad (8)$$

As long as the above processing is performed on each pixel in the main identified portion, the image shown in the left in FIG. 8 can be obtained. It should be noted that, when reducing the image by shortening the distance from the pixel to the reference point, if there is superimpose of a plurality of pixels, some pixels can be discarded. On the contrary, when enlarging the image by extending the distance between the image and the reference point, if some positions lack pixels so that the image is not smooth, then it is possible to fill pixels at the positions that lack pixel according to colors of pixels around the positions.

In addition, modifying the perspective relationship by way of software is modifying an image shot by a lens with one focal length (typically, a wide-angle lens, for example, 24 mm) into the perspective relationship shot by a lens with another proper focal length (e.g., 105 mm during portrait shot). However, since the two types of lens have different shooting ranges, especially when modifying an image shot by a lens with a small focal length into the perspective relationship shot by a lens with a larger focal length, a "blind angle" is apt to appear. The principle of generation of the "blind angle" will be described in detail below.

Figure 12:
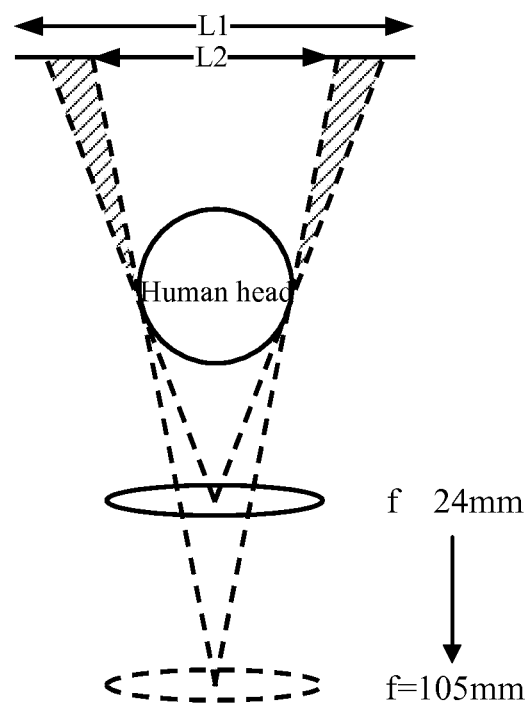
FIG. 12 is a schematic diagram illustrating generation of a blind angle.

As shown in FIG. 12, when shooting by using a wide-angle lens whose focal length is 24 mm, it is possible to shoot a wider range at a close distance; correspondingly, human head will block a bigger background region whose length is L1. However, when shooting by using a portrait lens whose focal length is 105 mm, the shooting range is smaller, thus it needs to shoot at a distance farther away from the human head so that the whole human head can be properly accommodated within one image, in this case, the human head will block a smaller background region whose length is L2. When modifying an image shot by a wide-angle lens into the perspective relationship shot by a telephoto lens by way of software, since the original image does not comprise information on part of the background region (the hatched section in FIG. 12), a blind angle like the hatched section in FIG. 13 will appear around the human head. Although the prior art has already proposed solutions of filling pixels in the region that lacks pixels based on the colors of pixels around, such solutions will not affect the visual effect only when the lacked pixels are a small number (e.g., several pixels are lacked), instead when the blind angle portion is larger (e.g., dozens or hundreds of pixels are lacked), it is impossible to render any background detail in this region, which thereby seriously affects the entire visual effect of the image.

Figure 14:
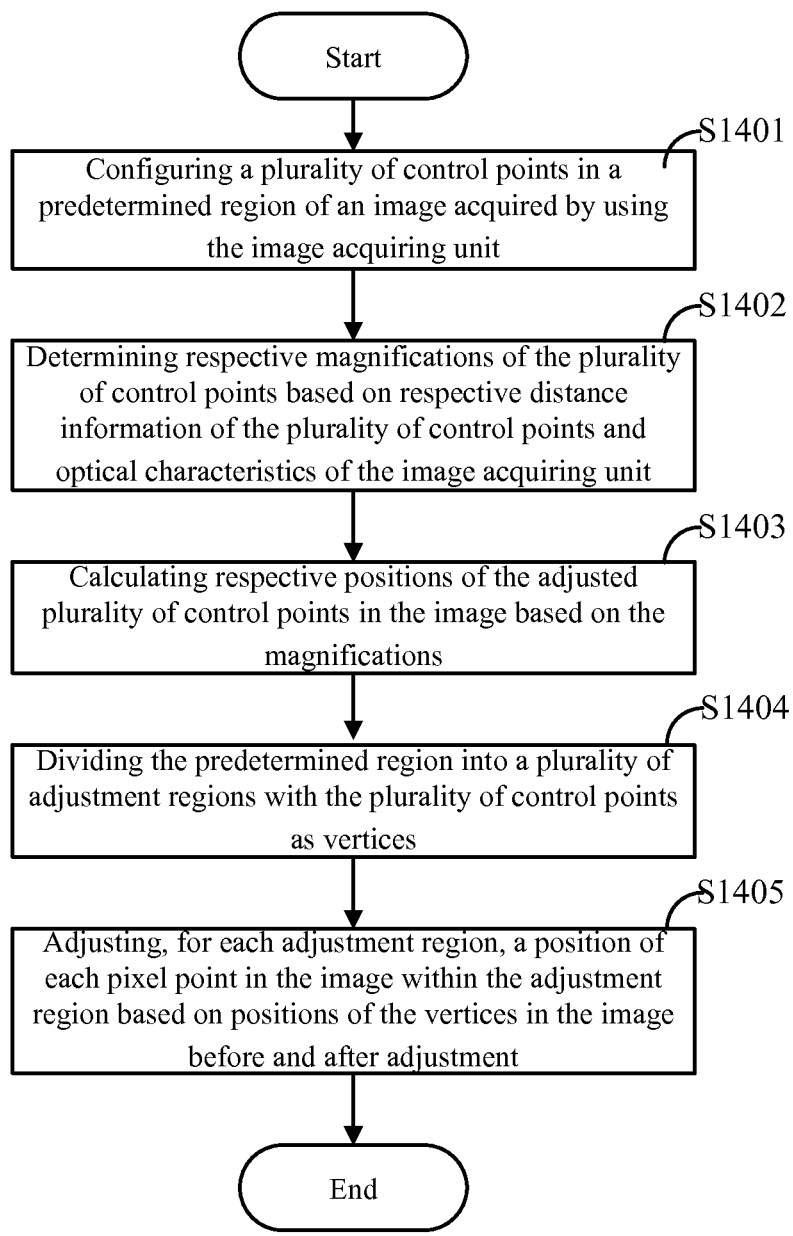
FIG. 14 is flowchart illustrating a second image processing method according to an embodiment of the present application.
Figure 15:
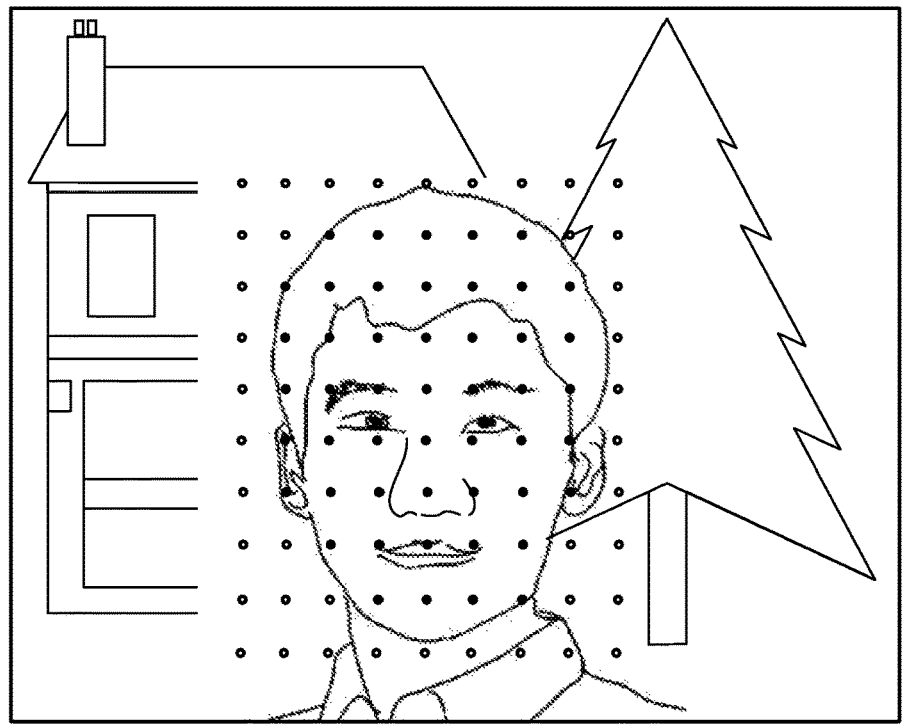
FIG. 15 is a schematic diagram illustrating configuring a plurality of control points in a predetermined region of an image.

FIG. 14 is flowchart illustrating a second image processing method according to an embodiment of the present application. As shown in FIG. 14, the method comprising the following steps:

First, configuring a plurality of control points in a predetermined region of an image acquired by using the image acquiring unit (step S1401). The predetermined region may for example be a main shot object and the region around. Each control point may be a specific pixel in the image. FIG. 15 is a schematic diagram illustrating configuring a plurality of control points in a predetermined region of an image. As shown in FIG. 15, human face is the main shot object during portrait shot, thus the human face and the region around may be regarded as the predetermined region. Although the predetermined region in FIG. 15 is a rectangular region, the predetermined region may also be a predetermined with an irregular shape or any other shape set along the outline of the main shot object. The human face in the image may be identified through the existing face identification technique. The predetermined region comprises a first region to which the main shot object corresponds and a second region to which a circumference around the main shot object corresponds. In FIG. 15, the control points in the first region are represented by solid circles "●", the control points in the second region are represented by hollow circles "○". Of course, the predetermined region may comprise only the first region to which the main shot object corresponds. In addition, the control points may be distributed uniformly in the predetermined region, and may also distributed unevenly. For example, more control points are set in the portion with more details (e.g., around the eye, nose) of the main shot object, less control points are set in the portion with less details (e.g., the cheek) etc. In this case, the greater the density of the control points is (i.e., the more control points in the predetermined region are), the more precise the adjusted image will be, but processing cost will also increases; the smaller the density of the control points is (i.e., the less the control points in the predetermined region are), processing cost can be effectively decreased, but preciseness of the image will be prejudiced. The number (density) of the control points may be set as needed. It should be noted that the main shot object is not limited to human face; it may be any other objects, sceneries and so on.

Figure 16:
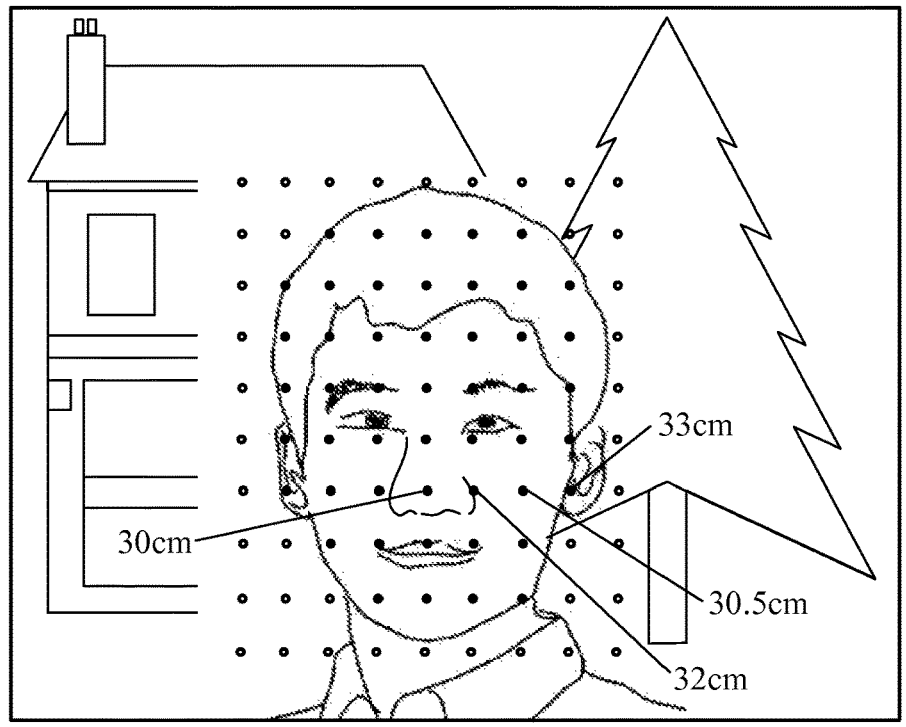
FIG. 16 is a schematic diagram illustrating distance information of a plurality of control points.

Returning to FIG. 14, next, determining respective magnifications of the plurality of control points based on respective distance information of the plurality of control points and optical characteristics of the image acquiring unit (step S1402). Here, the distance information indicates a distance from a shot object to which a control point corresponds to the image acquiring unit. The distance information may be obtained by at least one sensing unit on the electronic device. The sensing unit is an element for measuring a distance from the image acquiring unit to a shot object, it for example is an element like laser distance sensor, infrared distance sensor and so on, it may also be two or more cameras at different positions, and the distance information is obtained by analyzing the images shot by using these cameras. FIG. 16 is a schematic diagram illustrating distance information of a plurality of control points. As shown in FIG. 16, it is assumed that the shot object is human face and the sensing unit acquires that a distance from the image acquiring unit to the nose tip is 30 cm, a distance from the image acquiring unit to the nose groove is 32 cm, a distance from the image acquiring unit to the cheek is 30.5 cm, and a distance from the image acquiring unit to the ear root is 33 cm, then in the image, the distance information of the control point to which the nose tip corresponds is 30 cm, the distance information of the control point to which the nose groove corresponds is 32 cm, the distance information of the control point to which the cheek corresponds is 30.5 cm, and the distance information of the control point to which the ear root corresponds is 33 cm, and so on, and so forth, it is possible to obtain the distance information of each control point in the shot image. When the image acquiring unit is a camera including a lens and a photosensitive unit, it is possible to determine the magnification of each control point based on the distance information and optical characteristics of a focal length of the lens.

Figure 17:
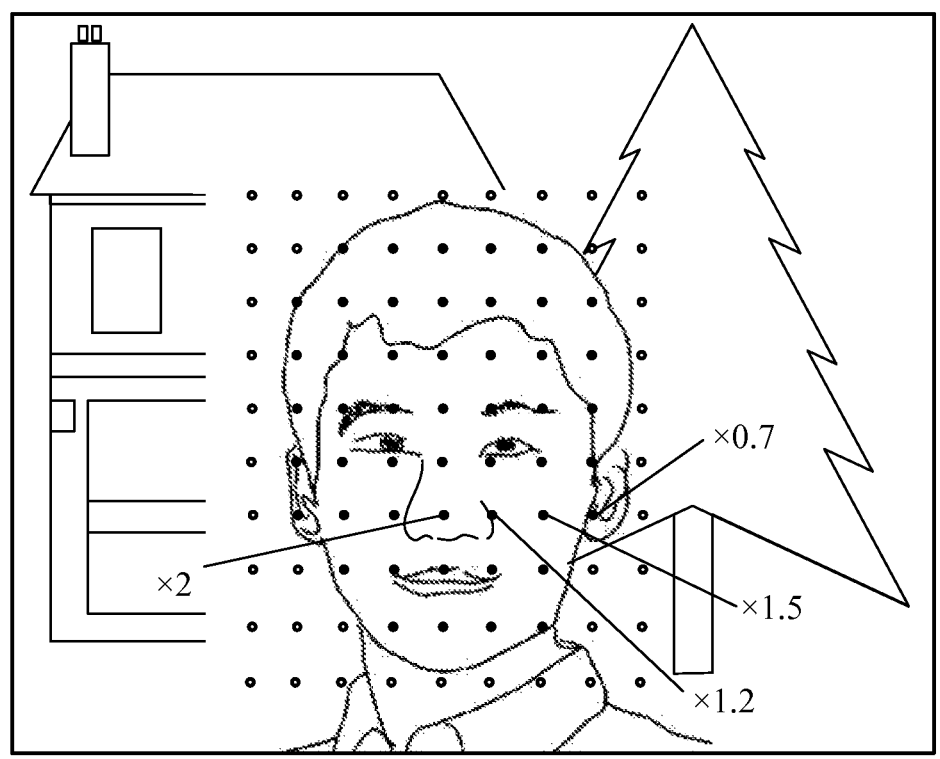
FIG. 17 is a schematic diagram illustrating magnifications of a plurality of control points.

Returning to FIG. 5, FIG. 5 is a diagram illustrating a relationship between magnification and distance of lenses with different focal lengths. Once the focal length of the lens is determined, then a unique relationship curve between the distance S and the magnification M can be obtained, that is, an optical characteristic curve to which the focal length corresponds. Thereby, the magnification of the control point can be determined based on the distance information of the control point and the characteristic curve to which the focal length of the lens corresponds. Specifically, it is possible to obtain the magnification as shown in FIG. 17 by combining the optical characteristic curve to which the focal length of the lens that shoots corresponds based on the distance information in FIG. 16. FIG. 17 is a schematic diagram illustrating magnifications of a plurality of control points. As shown in FIG. 17, it can be determined that the magnification of the control point to which the nose tip corresponds is 2 times, the magnification of the control point to which the nose groove corresponds is 1.2 times, the magnification of the control point to which the cheek corresponds is 1.5 times, and the magnification of the control point to which the ear root corresponds is 0.7 time, and so on, and so forth, it is possible to obtain the magnification of each control point whose distance is obtained.

Returning to FIG. 14, next, calculating respective positions of the plurality of control points in the image based on the magnifications (step S1403). After the magnifications of each of the control points are obtained, position of each control point in an image without perspective deformation can be obtained by adjusting the position of the control point in the image based on the magnification of the control point, thus reducing the portion whose magnification is larger and enlarging the portion whose magnification is smaller, and thereby obtaining the position of each control point in the image without deformation. Specifically, various methods may be used to reduce or enlarge a certain portion in an image. As an example, for each control point mentioned above, the distance from the control point to a point corresponding to an optical center of the lens in the image may be adjusted based on its magnification, so that the larger the magnification of the control point is, the shorter the distance from the control point to the point corresponding to an optical center of the lens in the image is.

Returning to FIG. 7, FIG. 7 also is a schematic diagram illustrating a relationship between magnification and position of pixel points. And the above Expressions (2) to (4) represent the distance adjustment relationship between the control point and the reference point.

Returning to FIG. 8, FIG. 8 also is a schematic diagram of adjusting positions of pixels in an image based on magnifications in an embodiment of the present application. In FIG. 8, "+" represents the reference point, which is a point corresponding to the optical center of the lens in the image. If magnification of the pixel at point p is M=2, it shows that the pixel is magnified two times relative to the standard size, thus the distance from the pixel to the reference point is reduced to a half according to Expression (4), that is, the pixel is moved to position p', that is, it is reduced as the standard size, as shown in the left in FIG. 8. If magnification of the pixel at point p is M=0.75, it shows that the pixel is reduced 0.75 time relative to the standard size, thus the distance from the pixel to the reference point is multiplied with 0.75 according to Expression (4), that is, the pixel is moved to the position q', that is, it is magnified as the standard size, as shown in the right in FIG. 8.

Specifically, it is supposed that coordinates of the reference point are $(x_0, y_0)$ and coordinates of the pixel before adjustment are $(x, y)$, then coordinates $(x', y')$ after adjustment respectively are as shown in Expressions (5) and (6). As long as the above processing is performed on each control point, positions of respective control points when the image is corrected to a standard image can be obtained.

FIGS. 9 and 10 mentioned above have already illustrated modifying an image shot by using a lens with one focal length to a perspective effect shot by using a lens with another focal length according to an embodiment of the present application, and the relationship between magnification and distance when modifying an image shot by using a lens with one focal length to a perspective effect of an image shot by using a lens with another focal length according to an embodiment of the present application, respectively. As long as the processing described with reference to FIGS. 9 and 10 and the processing represented by Expressions (7) and (8) are performed on each control point, coordinates of each control point after adjustment can be obtained.

Figure 18:
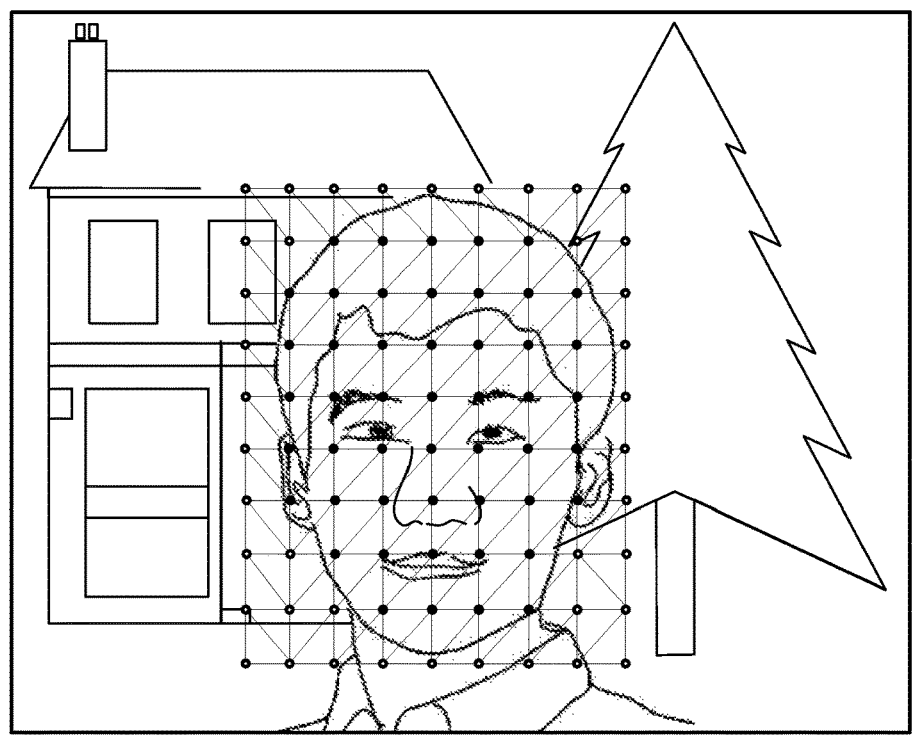
FIG. 18 is a schematic diagram illustrating dividing the predetermined region into a plurality of adjustment regions with the plurality of control points as vertices.

Returning to FIG. 14, next, dividing the predetermined region into a plurality of adjustment regions with the plurality of control points as vertices (step S1404). Specifically, it is possible to divide the predetermined region into a plurality of triangular regions by connecting three control points, or divide the predetermined region into a plurality of rectangular regions by connecting four control points, or divide the predetermined region into a plurality of regions with other shapes by a similar method. FIG. 18 is a schematic diagram illustrating dividing the predetermined region into a plurality of adjustment regions with the plurality of control points as vertices. As shown in FIG. 18, the predetermined region may be divided into a plurality of triangular regions, the dividing may be performed by using a Delaunay triangulation algorithm, no more details repeated here, for this algorithm is commonly known.

Returning to FIG. 14, next, adjusting, for each adjustment region, a position of each pixel point in the image within the adjustment region based on positions of the vertices in the image before and after adjustment (step S1405). With step S1403, respective positions of the plurality of control points in the image have already been calculated, in order to obtain an entire image, it needs to further adjust other pixel points based on these control points. Specifically, the position of each pixel point in each adjustment region before adjustment is mapped to the corresponding position in the adjustment region after adjustment, by means of performing such processing on all of the adjustment regions, it is possible to adjust the entire image into an desired perspective effect.

Figure 19:
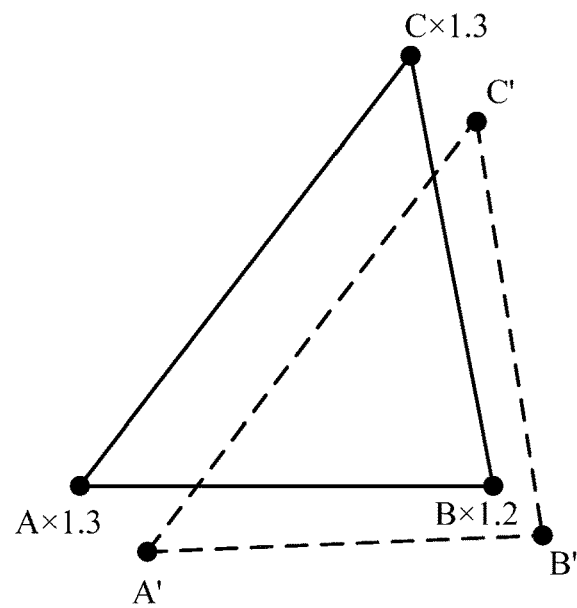
FIG. 19 is a schematic diagram of an adjustment region before and after adjustment when the vertices of the adjustment region all are on the main shot object.
Figure 20:
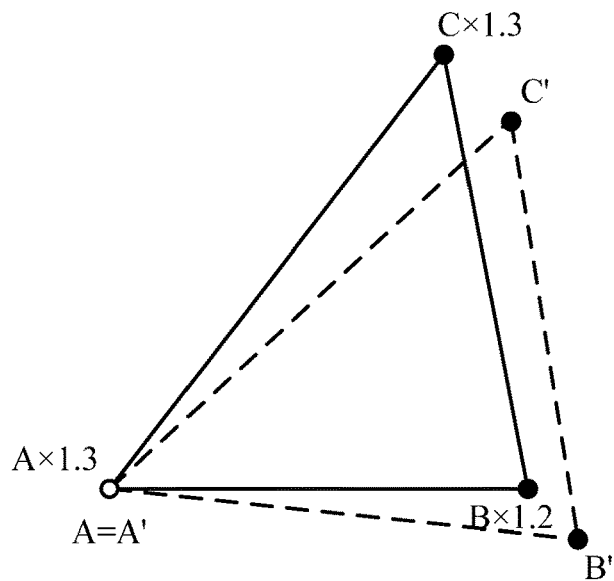
FIG. 20 is a schematic diagram of an adjustment region before and after adjustment when one vertex of the adjustment region is not on the main shot object.

When the predetermined region comprises a first region to which the main shot object corresponds and a second region to which a circumference around the main shot object corresponds, it is possible to adjust only the positions of the control points located in the first region in the image without adjusting the positions of the control points located in the second region in the image. Specifically, it is possible to not perform step S1402 (determining magnifications) and step S1403 (calculating positions in the image after adjustment) on the control points in the second region, i.e., hollow circles "○". FIG. 19 is a schematic diagram of an adjustment region before and after adjustment when the vertices of the adjustment region all are on the main shot object. As shown in FIG. 19, if three vertices A, B, C of a triangular adjustment region all are in the first region (i.e., all the three vertices are solid circles "●"), the positions A', B', C' of the three vertices in the image after adjustment can be obtained by performing steps S1402, S1403 on the three vertices. FIG. 20 is a schematic diagram of an adjustment region before and after adjustment when one vertex of the adjustment region is not on the main shot object. As shown in FIG. 20, if among the three vertices in the triangular adjustment region, A is a control point in the second region, B and C are control points in the first region, then no position adjustment is performed on the control point A, so that the positions A' (A), B', C' of the three vertices in the image after adjustment can be obtained. Since the second region mainly are pixels in a circumference around the shot object, positions of other pixels in the adjustment region in the image can be calculated by not changing the positions of the control points in the second region in the image and changing the positions of the control points in the first region in the image in common, so that it is possible to lock on the background around the main shot object without causing any blind angle in the adjusted image, and obtain a more natural image.

Figure 21:
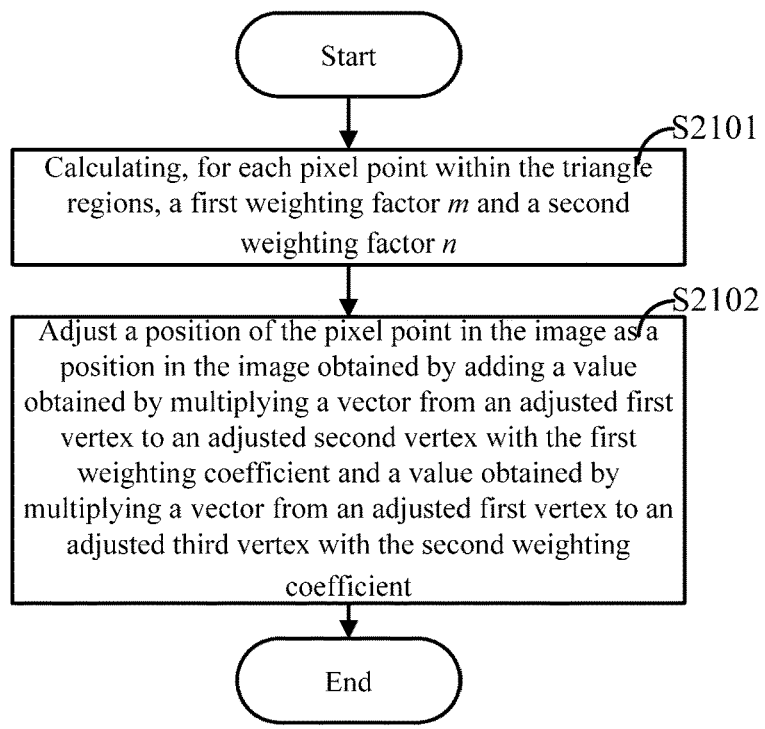
FIG. 21 is a flowchart of adjusting a position of each pixel point within the adjustment region in the image based on positions of the vertices in the image before and after adjustment.

Hereinafter, an embodiment of adjusting the position of each pixel point in the adjustment region in the image based on the positions of the vertices in the image before adjustment and the positions of the vertices in the image after adjustment will be described in detail in conjunction with the drawings. FIG. 21 is a flowchart of adjusting a position of each pixel point within the adjustment region in the image based on positions of the vertices in the image before and after adjustment. As shown in FIG. 21, first, calculating, for each pixel point within the triangle regions, a first weighting factor and a second weighting factor (step S2101). The first weighting factor is a weighting coefficient of a vector from a first vertex of the triangular regions to a second vertex thereof, the second weighting factor is a weighting coefficient of a vector from a first vertex of the triangular regions to a third vertex thereof.

Figure 22:
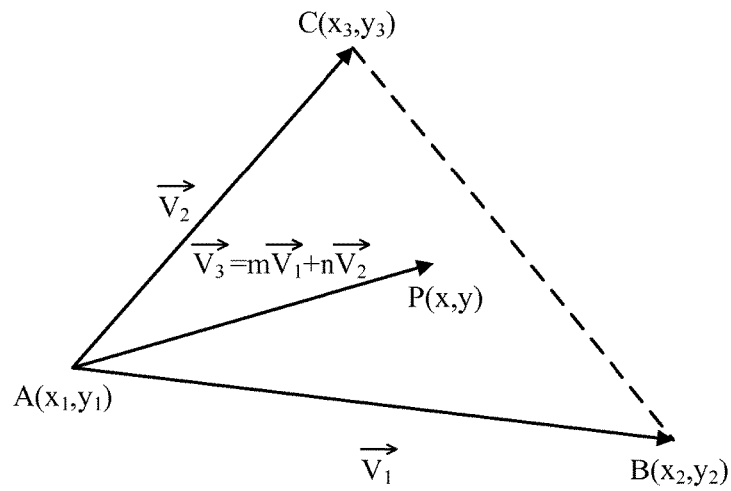
FIG. 22 is a schematic diagram illustrating a relationship between a certain point and a vector of a vertex in the adjustment region.

FIG. 22 is a schematic diagram illustrating a relationship between a certain point and a vector of a vertex in the adjustment region. As shown in FIG. 22, it is assumed that the vector pointing from vertex A $(x_1, y_1)$ to vertex B $(x_2, y_2)$ is $\vec{V}_1$ and the vector pointing from vertex A $(x_1, y_1)$ to vertex C $(x_3, y_3)$ is $\vec{V}_2$, then the vector $\vec{V}_3$ pointing from vertex A $(x_1, y_1)$ to any point P $(x, y)$ within the adjustment region may be represented by the following expression:

$$\vec{V}_3 = m\vec{V}_1 + n\vec{V}_2 \quad (m \geq 0, n \geq 0, m+n \leq 1) \tag{9}$$

Here, m is the weighting factor of $\vec{V}_3$ on $\vec{V}_1$, n is the weighting factor of $\vec{V}_3$ on $\vec{V}_2$, then each point P within the triangular adjustment region can correspond to unique m and n.

Since the respective coordinates of the vertices are already known, then m and n of any point P in the triangular adjustment region can be obtained by the following expression:

$$m = \frac{(y_2 - y_3)(x - x_3) + (x_3 - x_2)(y - y_3)}{(y_2 - y_3)(x_1 - x_3) + (x_3 - x_2)(y_1 - y_3)} \tag{10}$$

$$n = \frac{(y_3 - y_1)(x - x_3) + (x_1 - x_2)(y - y_3)}{(y_2 - y_3)(x_1 - x_3) + (x_3 - x_2)(y_1 - y_3)} \tag{11}$$

Next, point P is mapped to the position in the adjustment region after adjustment based on m and n (step S2102). Specifically, in step S503, positions of the vertices in the adjustment region after adjustment are already known, then the vector $\vec{V}'_1$ from A' to B' and the vector $\vec{V}'_2$ from A' to C' can be obtained, and further, the position of point P can be obtained in the adjustment region after adjustment by the following expression:

$$\vec{V}_3 = m\vec{V}'_1 + n\vec{V}'_2 \tag{12}$$

Figure 13:
FIG. 13 is a schematic diagram illustrating distance information of pixels in an embodiment of the present application when a blind angle is generated.

It is possible to perform the above processing on each pixel point P within the adjustment region, so that all the pixels in the adjustment region before adjustment can be all mapped to the adjustment region after adjustment. When area of the adjustment region after adjustment is larger than area of the adjustment region before adjustment, probably, vacant pixel points that do not correspond to any pixel points in the adjustment region before adjustment may appear in the adjustment region after adjustment. But normally, such vacant pixel points only are a small number and disperse, the case that dozens or hundreds of pixels are vacant as shown in FIG. 13 will not appear, thus compensating for these vacant pixel points according to the surrounding pixels by an existing method like bilinear interpolation will not seriously affect the entire visual effect of the image.

By means of performing the processing described above on each adjustment region, it is possible to modify an image shot by a lens with any focal length into an image in which distortion caused by perspective deformation is eliminated or an image with a perspective effect shot by a lens with any focal length without blind angle.

Multiple embodiments of the image processing method in the present application have been described above. Obviously, those skilled in the art can make various combinations, modifications, or variants on the aforesaid embodiments without departing from the spirit and scope of the present application. Other embodiments obtained by those with ordinary skill in the art without paying inventive effort all are within the scope sought for protection in the present application.

Second Electronic Device

Hereinafter, a second electronic device will be described below in conjunction with the accompanying drawings. The electronic device in the present application comprises an image acquiring unit. The image acquiring unit typically is a camera with photosensitive elements like CCD or CMOS and so on, but in fact it is not limited thereto, the image acquiring unit may also be any other type of sensors capable of acquiring an image. The electronic device is not limited to devices that give priority to the picture shooting function like video camera, camera etc., it may be for example devices that give priority to the computing function like tablet PC, notebook computer, desktop computer, PDA etc., may also be devices that give priority to the display function like e-book, TV, monitor etc., and may also be devices that give priority to the calling function like smart phone, portable phone etc., so long as it comprises an image acquiring unit.

Figure 23:
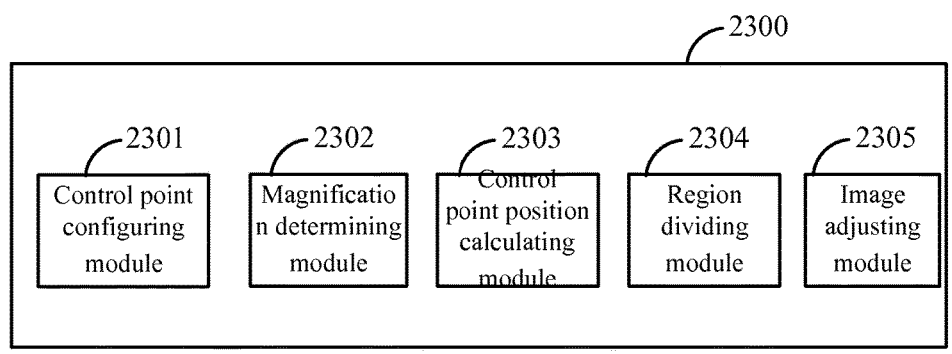
FIG. 23 is a functional block diagram of a second electronic device according to an embodiment of the present application.

FIG. 23 is a functional block diagram of a second electronic device according to an embodiment of the present application. As shown in FIG. 23, the electronic device 2300 comprises: a control point configuring module 2301, a magnification determining module 2302, a control point position calculating module 2303, a region dividing module 2304, and an image adjusting module 2305.

The control point configuring module 2301 configures a plurality of control points in a predetermined region of the image acquired by using the image acquiring unit. The predetermined region may for example be a main shot object and the region around. Each control point may be a specific pixel in the image. FIG. 15 is a schematic diagram illustrating configuring a plurality of control points in a predetermined region of an image. As shown in FIG. 15, human face is the main shot object during portrait shot, thus the human face and the region around may be regarded as the predetermined region. Although the predetermined region in FIG. 15 is a rectangular region, the predetermined region may also be a predetermined with an irregular shape or any other shape set along the outline of the main shot object. The human face in the image may be identified through the existing face identification technique. The predetermined region comprises a first region to which the main shot object corresponds and a second region to which a circumference around the main shot object corresponds. In FIG. 15, the control points in the first region are represented by solid circles "●", the control points in the second region are represented by hollow circles "○". Of course, the predetermined region may comprise only the first region to which the main shot object corresponds. In addition, the control points may be distributed uniformly in the predetermined region, and may also distributed unevenly. For example, more control points are set in the portion with more details (e.g., around the eye, nose) of the main shot object, less control points are set in the portion with less details (e.g., the cheek) etc. In this case, the greater the density of the control points is (i.e., the more control points in the predetermined region are), the more precise the adjusted image will be, but processing cost will also increases; the smaller the density of the control points is (i.e., the less the control points in the predetermined region are), processing cost can be effectively decreased, but preciseness of the image will be prejudiced. The number (density) of the control points may be set as needed. It should be noted that the main shot object is not limited to human face; it may be any other objects, sceneries and so on.

The magnification determining module 2302 determines respective magnifications of the plurality of control points based on respective distance information of the plurality of control points and optical characteristics of the image acquiring unit. Here, the distance information indicates a distance from a shot object to which a control point corresponds to the image acquiring unit. The distance information may be obtained by at least one sensing unit on the electronic device. The sensing unit is an element for measuring a distance from the image acquiring unit to a shot object, it for example is an element like laser distance sensor, infrared distance sensor and so on, it may also be two or more cameras at different positions, and the distance information is obtained by analyzing the images shot by using these cameras. FIG. 16 is a schematic diagram illustrating distance information of a plurality of control points. As shown in FIG. 16, it is assumed that the shot object is human face and the sensing unit acquires that a distance from the image acquiring unit to the nose tip is 30 cm, a distance from the image acquiring unit to the nose groove is 32 cm, a distance from the image acquiring unit to the cheek is 30.5 cm, and a distance from the image acquiring unit to the ear root is 33 cm, then in the image, the distance information of the control point to which the nose tip corresponds is 30 cm, the distance information of the control point to which the nose groove corresponds is 32 cm, the distance information of the control point to which the cheek corresponds is 30.5 cm, and the distance information of the control point to which the ear root corresponds is 33 cm, and so on, and so forth, it is possible to obtain the distance information of each control point in the shot image. When the image acquiring unit is a camera including a lens and a photosensitive unit, it is possible to determine the magnification of each control point based on the distance information and optical characteristics of a focal length of the lens. FIG. 5 is a diagram illustrating a relationship between magnification and distance of lenses with different focal lengths. As shown in FIG. 5, no matter the lens is of what types of focal length, the same rule is followed: the farther the object is away from the lens, the more the object in the image is reduced; the closer the object is away from the lens, the more the object in the image is magnified. However, a curve slop coefficient of a lens whose focal length is 24 mm is larger than that of a lens whose focal length is 105 mm, which suggests that the degree of size change caused by distance in the wide-angle lens is more severe than the degree of size change caused by distance in the telephoto lens, in other words, the perspective relationship of the image shot by the wide-angle lens is stronger than the perspective relationship of the image shot by the telephoto lens. A base point of the magnification is an optical center of the lens, that is, the magnification of the size of the object to which the optical center of the lens is aligned. It should be noted that although FIG. 5 only shows the rule for the lens whose focal length is 24 mm and the lens whose focal length is 105 mm, in fact, this rule is also applicable to the lens with other focal lengths. Under ideal conditions, the following relationship is satisfied:

$$M = \frac{f}{S-f} \quad (1)$$

where the focal length of the lens is f, the distance from the lens to the shot object is S, and the magnification is M.

Thus it is seen that, once the focal length of the lens is determined, then a unique relationship curve between the distance S and the magnification M can be obtained, that is, an optical characteristic curve to which the focal length corresponds. Thereby, the magnification of the control point can be determined based on the distance information of the control point and the characteristic curve to which the focal length of the lens corresponds. Specifically, it is possible to obtain the magnification as shown in FIG. 17 by combining the optical characteristic curve to which the focal length of the lens that shoots corresponds based on the distance information in FIG. 16. FIG. 17 is a schematic diagram illustrating magnifications of a plurality of control points. As shown in FIG. 17, it can be determined that the magnification of the control point to which the nose tip corresponds is 2 times, the magnification of the control point to which the nose groove corresponds is 1.2 times, the magnification of the control point to which the cheek corresponds is 1.5 times, and the magnification of the control point to which the ear root corresponds is 0.7 time, and so on, and so forth, it is possible to obtain the magnification of each control point whose distance is obtained.

The control point position calculating module 2303 calculates respective positions of the plurality of control points in the image based on the magnifications. After the magnifications of each of the control points are obtained, position of each control point in an image without perspective deformation can be obtained by adjusting the position of the control point in the image based on the magnification of the control point, thus reducing the portion whose magnification is larger and enlarging the portion whose magnification is smaller, and thereby obtaining the position of each control point in the image without deformation. Specifically, various methods may be used to reduce or enlarge a certain portion in an image. As an example, for each control point mentioned above, the distance from the control point to a point corresponding to an optical center of the lens in the image may be adjusted based on its magnification, so that the larger the magnification of the control point is, the shorter the distance from the control point to the point corresponding to an optical center of the lens in the image is.

FIG. 7 is a schematic diagram illustrating a relationship between magnification and position of pixel points. In FIG. 7, L1 and L2 are sizes of two objects, S1 and S2 are distances from the two objects to a certain reference point, respectively, according to principles of similar triangles, the following is satisfied:

$$\frac{L1}{S1} = \frac{L2}{S2} \quad (2)$$

It is supposed that L1 is a size of a standard object (for example, the size of the object to which an optical center of the lens is aligned), L2 is a size of an object that is enlarged due to perspective deformation (magnification M≥1), then the magnification M is:

$$M = \frac{L2}{L1} \quad (3)$$

Therefore, if it is desired to eliminate distortion caused by perspective deformation, that is, reducing the enlarged object whose size is L2 into the size L1, then the distance between the pixel and the reference point may be adjusted as:

$$S1 = \frac{L1 \times S2}{L2} = \frac{S2}{M} \quad (4)$$

FIG. 8 is a schematic diagram of adjusting positions of pixels in an image based on magnifications in an embodiment of the present application. In FIG. 8, "+" represents the reference point, which is a point corresponding to the optical center of the lens in the image. If magnification of the pixel at point p is M=2, it shows that the pixel is magnified two times relative to the standard size, thus the distance from the pixel to the reference point is reduced to a half according to Expression (4), that is, the pixel is moved to position p', that is, it is reduced as the standard size, as shown in the left in FIG. 8. If magnification of the pixel at point p is M=0.75, it shows that the pixel is reduced 0.75 time relative to the standard size, thus the distance from the pixel to the reference point is multiplied with 0.75 according to Expression (4), that is, the pixel is moved to the position q', that is, it is magnified as the standard size, as shown in the right in FIG. 8.

Specifically, it is supposed that coordinates of the reference point are $(x_0, y_0)$ and coordinates of the pixel before adjustment are $(x, y)$, then coordinates $(x', y')$ after adjustment respectively are:

$$x' = x_0 + \frac{(x - x_0)}{M} \quad (5)$$

$$y' = y_0 + \frac{(y - y_0)}{M} \quad (6)$$

As long as the above processing is performed on each control point, positions of respective control points when the image is corrected to a standard image can be obtained.

However, besides correcting the distortion caused by perspective deformation, sometimes users desire to obtain an image with a distortion degree shot by a lens with other focal lengths. For example, it is generally considered that the lens with a focal length of 85 mm to 135 mm is best suited for shooting a portrait. Because a person's facial features are the most beautiful when looking from 1.2 to 1.5 meters away, the perspective effect at this distance makes a person's nose appear slightly smaller than it actually is and the face is not so planar. And it requires a focal length of 85 mm to 135 mm to accommodate a human face when the shooting range is 1.2 to 1.5 meters. But, generally, the lens of the image acquiring unit attached to electronic devices, especially those that do not give priority to the shooting function, is a wide-angle lens. In this case, if the perspective relationship shot with the wide-angle lens can be modified to the perspective relationship shot with a focal length of 85 mm to 135 mm, then a "beautifying" effect can be achieved.

In order to solve this technical problem, the present application further provides an embodiment, to modify an image shot with a lens having one focal length into an image shot with a lens having another focal length, so as to change the perspective relationship. Hereinafter, description is provided with modifying the human face image shot with a lens with a focal length of 24 mm as the perspective effect shot with a lens with a focal length of 105 mm as example, but in fact it is not limited thereto, as will be appreciated by those skilled in the art, the method can modify an image shot by using a lens with an arbitrary focal length to a perspective effect of an image shot by using other lens with an arbitrary focal length. In addition, the shot object is not limited to human face; it may be any other objects, sceneries and so on.

FIG. 9 is a schematic diagram of modifying an image shot by using a lens with one focal length to a perspective effect shot by using a lens with another focal length according to an embodiment of the present application. The image shown in the right in FIG. 9 can be obtained when shooting human face using a wide-angle lens with a focal length of 24 mm at a close distance. Since the distance is closer, the perspective relationship is stronger, thus resulting in that the nose in the shot human face becomes larger. Thus people want to modify it as the perspective effect shot using a lens with a focal length of 105 mm from a relative farther distance, that is, modified as the image shown in the left in FIG. 9. In this case, it is possible to obtain a current magnification $M_{24}$ and a target magnification $M_{105}$ of each control point based on the distance information of each control point and an optical characteristic curve whose focal lengths are 24 mm and 105 mm. Details of obtaining the current magnification $M_{24}$ have already been described in the above, no more repeats here. After obtaining the current magnification $M_{24}$ of each control point in the main identified portion, it is possible to calculate the current maximum magnification, minimum magnification, and average magnification of these control points. As shown in the right in FIG. 9, in this example, among all the control points in the main identified portion in the human face image shot with a focal length of 24 mm, the maximum magnification is 1.3, the minimum magnification is 0.7, and the average magnification is 1.02. FIG. 10 is a schematic diagram illustrating a relationship between magnification and distance when modifying an image shot by using a lens with one focal length to a perspective effect of an image shot by using a lens with another focal length according to an embodiment of the present application. As shown in FIG. 10, the points corresponding to the maximum magnification (1.3), the minimum magnification (0.7), and the average magnification (1.02) are found in the optical characteristic curve whose focal length is 24 mm. Since the magnification M and the distance S correspond to each other one by one, thus a distance difference between the distance to which the maximum magnification corresponds and the distance to which the minimum magnification corresponds is a distance $\Delta S$ (i.e., the difference between the maximum distance information and the minimum distance information among the plurality of control points) between the portion (nose tip) that is closest to the lens in the human face to the portion (edge of the cheek) that is farthest to the lens, as shown in FIG. 12. It should be noted that, the larger the focal length is, the farther the lens needs to be away from the human face, and the smaller the focal length is, the nearer the lens needs to be away from the human face, thus when modifying the image shot with a lens with a focal length of 24 mm as the perspective effect shot with a lens with a focal length of 105 mm, in order to obtain the same image (such as the human face occupies the whole image), the lens needs to be far away from the human head. Since the actual size of human face maintains unchanged, no matter shooting by a lens with what focal length, the distance $\Delta S$ is constant (e.g., 10 cm). Thus, it is possible to first find a point to which the average magnification (1.02) corresponds in the optical characteristic curve whose focal length is 105 mm, and then perform a translation with this point as a reference (as shown by the arrow in FIG. 10), thus the target magnification $M_{105}$ of each control point when using a lens with a focal length of 105 mm to shot an image in which human face occupied the whole image can be obtained for the control point, for example, the maximum magnification is 1.05, the minimum magnification is 0.95 etc., as shown in the left in FIG. 9.

Next, it is possible to perform the following processing on each control point.

First, a difference $S_{offset}$ between distance information $S_1$ of the control point and a distance to which a pixel having an average magnification (1.02) on the optical characteristic curve whose focal length is 24 mm corresponds is calculated.

Second, a distance $S_{avg105}$ to which a pixel having an average magnification (1.02) on the optical characteristic curve whose focal length is 105 mm corresponds is obtained.

Last, a magnification $M_{105}$ of a point to which a distance obtained by adding $S_{avg105}$ and $S_{offset}$ corresponds is obtained.

The above processing is performed on each control point in the main identified portion so that the target magnification $M_{105}$ for each control point can be obtained.

Next, the control point position calculating module 2303 calculates the position of the adjusted control point in the image based on the current magnification $M_{24}$ and the target magnification $M_{105}$ of each control point. As an example, for each control point whose current magnification $M_{24}$ and target magnification $M_{105}$ are obtained, the distance from the control point to a point corresponding to an optical center of the lens in the image is adjusted. In particular, it is supposed that coordinates of the reference point (the pixel to which the optical center of the lens corresponds) are $(x_0, y_0)$ and coordinates of the control point before adjustment are (x, y), then coordinates (x', y') after adjustment respectively are:

$$x' = x_0 + \frac{M_{105} \times (x - x_0)}{M_{24}} \qquad (7)$$

$$y' = y_0 + \frac{M_{105} \times (y - y_0)}{M_{24}} \qquad (8)$$

As long as the above processing is performed on each control point, coordinates of each control point after adjustment can be obtained.

The region dividing module 2304 divides the predetermined region into a plurality of adjustment regions with the plurality of control points as vertices. Specifically, it is possible to divide the predetermined region into a plurality of triangular regions by connecting three control points, or divide the predetermined region into a plurality of rectangular regions by connecting four control points, or divide the predetermined region into a plurality of regions with other shapes by a similar method. FIG. 18 is a schematic diagram illustrating dividing the predetermined region into a plurality of adjustment regions with the plurality of control points as vertices. As shown in FIG. 18, the predetermined region may be divided into a plurality of triangular regions, the dividing may be performed by using a Delaunay triangulation algorithm, no more details repeated here, for this algorithm is commonly known.

The image adjusting module 2305 adjusts, for each adjustment region, a position of each pixel point in the image within the adjustment region based on positions of the vertices in the image before adjustment and after adjustment as calculated by the control point position calculating module. Respective positions of the adjusted plurality of control points in the image have already been calculated by the control point position calculating module 2303, in order to obtain an entire image, it needs to further adjust other pixel points based on these control points. Specifically, the position of each pixel point in each adjustment region before adjustment is mapped to the corresponding position in the adjustment region after adjustment, by means of performing such processing on all of the adjustment regions, it is possible to adjust the entire image into an desired perspective effect.

When the predetermined region comprises a first region to which the main shot object corresponds and a second region to which a circumference around the main shot object corresponds, it is possible to adjust only the positions of the control points located in the first region in the image without adjusting the positions of the control points located in the second region in the image. Specifically, it is possible for the magnification determining module 2302 and the control point position calculating module 2303 to not determine magnifications and calculate positions in the image after adjustment for the control points in the second region, i.e., hollow circles "○". FIG. 19 is a schematic diagram of an adjustment region before and after adjustment when the vertices of the adjustment region all are on the main shot object. As shown in FIG. 19, if three vertices A, B, C of a triangular adjustment region all are in the first region (i.e., all the three vertices are solid circles "●"), the positions A', B', C' of the three vertices in the image after adjustment can be obtained by the control point position calculating module 2303 based on the magnifications of the three vertices. FIG. 20 is a schematic diagram of an adjustment region before and after adjustment when one vertex of the adjustment region is not on the main shot object. As shown in FIG. 20, if among the three vertices in the triangular adjustment region, A is a control point in the second region, B and C are control points in the first region, then no position adjustment is performed on the control point A, so that the positions A' (A), B', C' of the three vertices in the image after adjustment can be obtained. Since the second region mainly are pixels in a circumference around the shot object, positions of other pixels in the adjustment region in the image can be calculated by not changing the positions of the control points in the second region in the image and changing the positions of the control points in the first region in the image in common, so that it is possible to lock on the background around the main shot object without causing any blind angle in the adjusted image, and obtain a more natural image.

Figure 24:
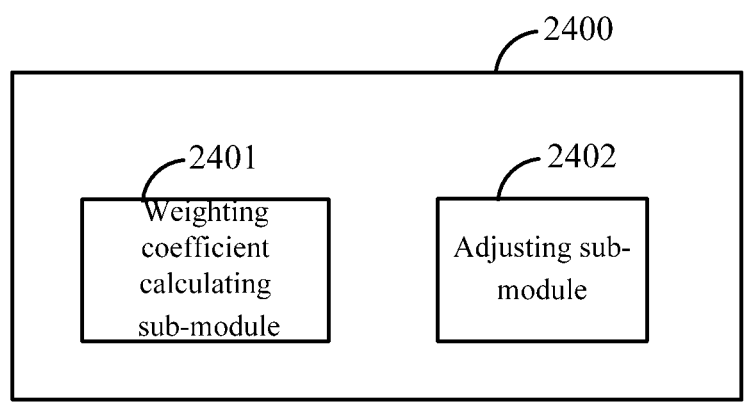
FIG. 24 is a functional block diagram of an image adjusting module in the electronic device according to an embodiment of the present application.

Hereinafter, an embodiment of adjusting the position of each pixel point in the adjustment region in the image based on the positions of the vertices in the image before adjustment and the positions of the vertices in the image after adjustment will be described in detail in conjunction with the drawings. Hereinafter, an embodiment of adjusting the position of each pixel point in the adjustment region in the image based on the positions of the vertices in the image before adjustment and the positions of the vertices in the image after adjustment will be described in detail in conjunction with the drawings. FIG. 24 is a functional block diagram of an image adjusting module in the electronic device according to an embodiment of the present application. As shown in FIG. 24, the image adjusting module 2400 comprises a weighting coefficient calculating sub-module 2401 and an adjusting sub-module 2402.

The weighting coefficient calculating sub-module 2401 calculates, for each pixel point within the triangle regions, a first weighting factor and a second weighting factor. The first weighting factor is a weighting coefficient of a vector from a first vertex of the triangular regions to a second vertex thereof, the second weighting factor is a weighting coefficient of a vector from a first vertex of the triangular regions to a third vertex thereof.

FIG. 22 is a schematic diagram illustrating a relationship between a certain point and a vector of a vertex in the adjustment region. As shown in FIG. 22, it is assumed that the vector pointing from vertex A $(x_1, y_1)$ to vertex B $(x_2, y_2)$ is $\vec{V}_1$ and the vector pointing from vertex A $(x_1, y_1)$ to vertex C $(x_3, y_3)$ is $\vec{V}_2$, then the vector $\vec{V}_3$ pointing from vertex A $(x_1, y_1)$ to any point P $(x, y)$ within the adjustment region may be represented by the following expression:

$$\vec{V}_3 = m\vec{V}_1 + n\vec{V}_2 \quad (m \geq 0, n \geq 0, m+n \leq 1) \tag{9}$$

Here, m is the weighting factor of $\vec{V}_3$ on $\vec{V}_1$, n is the weighting factor of $\vec{V}_3$ on $\vec{V}_2$, then each point P within the triangular adjustment region can correspond to unique m and n.

Since the respective coordinates of the vertices are already known, then m and n of any point P in the triangular adjustment region can be obtained by the following expression:

$$m = \frac{(y_2 - y_3)(x - x_3) + (x_3 - x_2)(y - y_3)}{(y_2 - y_3)(x_1 - x_3) + (x_3 - x_2)(y_1 - y_3)} \tag{10}$$

$$n = \frac{(y_3 - y_1)(x - x_3) + (x_1 - x_2)(y - y_3)}{(y_2 - y_3)(x_1 - x_3) + (x_3 - x_2)(y_1 - y_3)} \tag{11}$$

Next, point P is mapped to the position in the adjustment region after adjustment based on m and n (step S2102). Specifically, in step S503, positions of the vertices in the adjustment region after adjustment are already known, then the vector $\vec{V}'_1$ from A' to B' and the vector $\vec{V}'_2$ from A' to C' can be obtained, and further, the position of point P can be obtained in the adjustment region after adjustment by the following expression:

$$\vec{V}_3 = m\vec{V}'_1 + n\vec{V}'_2 \tag{12}$$

It is possible for the adjusting sub-module 2402 to perform the above processing on each pixel point P within the adjustment region, so that all the pixels in the adjustment region before adjustment can be all mapped to the adjustment region after adjustment. When area of the adjustment region after adjustment is larger than area of the adjustment region before adjustment, probably, vacant pixel points that do not correspond to any pixel points in the adjustment region before adjustment may appear in the adjustment region after adjustment. But normally, such vacant pixel points only are a small number and disperse, the case that dozens or hundreds of pixels are vacant as shown in FIG. 13 will not appear, thus compensating for these vacant pixel points according to the surrounding pixels by an existing method like bilinear interpolation will not seriously affect the entire visual effect of the image.

By means of performing the processing described above on each adjustment region, it is possible to modify an image shot by a lens with any focal length into an image in which distortion caused by perspective deformation is eliminated or an image with a perspective effect shot by a lens with any focal length without blind angle.

Through the above description of the implementations, a person skilled in the art can clearly understand that the present disclosure may be implemented in a manner of software plus a necessary hardware platform, and of course the present disclosure may also be implemented fully by hardware. Based on such understanding, the technical solution of the present disclosure that contributes to the background art may be embodied in whole or in part in the form of a computer software product. The computer software product may be stored in a storage medium, such as ROM/RAM, disk, CD-ROM, and comprise several instructions for causing a computer apparatus (which may be a personal computer, a server, or a network device) to perform the method described in the various embodiments of the present disclosure or certain parts thereof.

Multiple embodiments of the image processing method in the present application have been described above. Obviously, those skilled in the art can make various combinations, modifications, or variants on the aforesaid embodiments without departing from the spirit and scope of the present application. Other embodiments obtained by those with ordinary skill in the art without paying inventive effort all are within the scope sought for protection in the present application.

The invention claimed is:

1. An image processing method applied to an electronic device with an image acquiring unit, the method comprising:
configuring a plurality of control points in a predetermined region of an image acquired by the image acquiring unit;
determining respective magnifications of the plurality of control points based on respective distance information of the plurality of control points and optical characteristics of the image acquiring unit, the distance information indicating a distance from the image acquiring unit to a shot object to which a control point corresponds;
calculating respective positions of the plurality of control points in the image based on the magnifications;
dividing the predetermined region into a plurality of adjustment regions with the plurality of control points as vertices; and
adjusting, for each adjustment region, a position of each pixel point in the image within the adjustment region based on positions of the vertices in the image before and after adjustment.

2. The image processing method according to claim 1, wherein determining respective magnifications of the plurality of control points based on respective distance information of the plurality of control points and optical characteristics of the image acquiring unit comprises determining respective magnifications of the plurality of control points based on the respective distance information of the plurality of control points and a characteristic curve corresponding to a focal length of the image acquiring unit, the characteristic curve indicating a relationship between a magnification and the distance from the image acquiring unit to the shot object.

3. The image processing method according to claim 1, wherein dividing the predetermined region into a plurality of adjustment regions comprises:
dividing the predetermined region into a plurality of triangular regions,
adjusting a position of each pixel point in the image within the adjustment region based on positions of the vertices in the image before and after adjustment comprises:
calculating, for each pixel point within the triangle regions, a first weighting factor and a second weighting factor, the first weighting factor being a weighting coefficient of a vector from a first vertex of the triangular regions to a second vertex thereof, the second weighting factor being a weighting coefficient of a vector from the first vertex of the triangular regions to a third vertex thereof; and
adjusting the position of the pixel point in the image by adding a value obtained by multiplying a vector from an adjusted first vertex to an adjusted second vertex with the first weighting coefficient and a value obtained by multiplying a vector from an adjusted first vertex to an adjusted third vertex with the second weighting coefficient.

4. The image processing method according to claim 1, wherein the predetermined region comprises a first region to which the main shot object corresponds and a second region to which a circumference around the main shot object corresponds.

5. The image processing method according to claim 4, wherein respective positions of the plurality of control points in the image are positions of the control points in the image obtained by adjusting control points within the first region based on the magnifications without adjusting control points within the second region.

6. An electronic device comprising:
a processor;
a storage;
an image acquiring unit; and
wherein a computer program instruction is stored on the storage which, when executed by the processor, causes the processor to perform the following:
configuring a plurality of control points in a predetermined region of the image acquired by the image acquiring unit;
determining respective magnifications of the plurality of control points based on respective distance information of the plurality of control points and optical characteristics of the image acquiring unit, wherein the distance information indicates a distance from the image acquiring unit to a shot object to which a control point corresponds;
calculating respective positions of the plurality of control points in the image based on the magnifications;
dividing the predetermined region into a plurality of adjustment regions with the plurality of control points as vertices; and
an image adjusting module is configured to adjust adjusting, for each adjustment region, a position of each pixel point in the image within the adjustment region based on positions of the vertices in the image before adjustment and after adjustment.

7. The electronic device according to claim 6, wherein determining respective magnification of the plurality of control points based on respective distance information of the plurality of control points and optical characteristics of the image acquiring unit comprises determining respective magnifications of the plurality of control points based on the respective distance information of the plurality of control points and a characteristic curve corresponding to a focal length of the image acquiring unit, the characteristic curve indicating a relationship between a magnification and the distance from the image acquiring unit to the shot object.

8. The electronic device according to claim 6, wherein dividing the predetermined region into a plurality of adjustment regions comprises:
dividing the predetermined region into a plurality of triangular regions,
adjusting a position of each pixel point in the image within the adjustment region based on positions of the vertices in the image before and after adjustment comprises:
calculating, for each pixel point within the triangle regions, a first weighting factor and a second weighting factor, the first weighting factor being a weighting coefficient of a vector from a first vertex of the triangular regions to a second vertex thereof, the second weighting factor being a weighting coefficient of a vector from the first vertex of the triangular regions to a third vertex thereof; and adjusting the position of the pixel point in the image by adding a value obtained by multiplying a vector from an adjusted first vertex to an adjusted second vertex with the first weighting coefficient and a value obtained by multiplying a vector from an adjusted first vertex to an adjusted third vertex with the second weighting coefficient.

9. The electronic device according to claim 6, wherein the predetermined region comprises a first region to which the main shot object corresponds and a second region to which a circumference around the main shot object corresponds.

10. The electronic device according to claim 9, wherein respective positions of the plurality of control points in the image are positions of the control points in the image obtained by adjusting control points within the first region based on the magnifications without adjusting control points within the second region.

* * * * *